(12) United States Patent
Marwali

(10) Patent No.: US 6,466,465 B1
(45) Date of Patent: Oct. 15, 2002

(54) DIGITAL CONTROL OF VOLTAGE HARMONIC DISTORTION AND OVERLOAD CURRENT PROTECTION FOR INVERTERS

(75) Inventor: Mohammad N. Marwali, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 09/783,273

(22) Filed: Feb. 13, 2001

Related U.S. Application Data

(60) Provisional application No. 60/182,394, filed on Feb. 14, 2000.

(51) Int. Cl.[7] .................................................. H02M 1/12
(52) U.S. Cl. .................... 363/41; 363/56.03; 363/56.05; 361/79
(58) Field of Search ................................ 363/41, 56.03, 363/56.05, 50; 361/79, 18, 78; 307/64

(56) References Cited

U.S. PATENT DOCUMENTS 6,316,918 B1 * 11/2001 Underwood et al. .......... 322/20

OTHER PUBLICATIONS

Davison, E.J. and Scherzinger, B., "Perfect Control of the robust servomechanism problem", *IEEE Trans. On Automatic Control*, vol. AC–32, No. 8, Aug. 1987, pp. 689–702.
Francis, B. A., and Wonham, W.M., "The internal mode principle for linear multivariable regulators", *Appl. Math. Opt.*, vol. 2, pp. 170–194, 1975, no month.
Utkin, V., Guldner, J., Shi, J., *Sliding Mode Control in Electromechanical Systems*, Taylor & Franci, Philadelphia, PA, 1999, pp. 1–325, book, No month.

A. Schonung and H. Stemmler, "Static frequency changers with subharmonic control in conjunction with reversible variable speed drive," *BBC Rev.*, pp. 555–577, Aug./Sep. 1964.
P. D. Ziogas, "Optimum voltage and harmonic control of PWM techniques for three phase static UPS systems," *IEEE Trans. Ind. Appl.*, vol. IA–16, No. 4, pp. 542–546, Jul./Aug. 1980.
B. K. Bose and H. A. Sutherland, "A high performance pulse–width modulator for an inverterfed drive system using a microcomputer," in *Conf. Rec. 1982 Ann. Meet. Ind. Appl. Soc.*, pp 847–853, Oct. 1982.

(List continued on next page.)

*Primary Examiner*—Shawn Riley
(74) *Attorney, Agent, or Firm*—Howrey Simon Arnold & White LLP

(57) ABSTRACT

A method reducing transient overshoot of an output signal of an uninterruptable power supply, the uniterruptable power supply including: (a) an inverter having at least one power switch; (b) a digital controller that generates a pulse width modulated (PWM) signal for controlling the power switch, the PWM signal having a fixed period $T_{PWM}$ and (c) an analog to digital signal corresponding to the sampled output signal, the method comprising the steps of (1) operating the A/D converter to sample the output signal at a first time to generate a first sampled output value; (2) operating the A/D converter to sample the output signal at a second time to generate a second sampled output value, the period between the second time and the first time being equal to $T_{PWM}$; (3) generating a control input value that is equal to 1.5 times the second sampled output value minus 0.5 times the first sampled output value; (4) computing a PWM signal at a third time, the PWM pulse having a duration equal to the PWM pulse duration, the period between the second time and the third time being equal to 0.5 $T_{PWM}$.

1 Claim, 18 Drawing Sheets

OTHER PUBLICATIONS

H. S. Patel and R. G. Hoft, "Generalized techniques of harmonic elimination and voltage control in thyristor inverter, Part I–Harmonic Elimination," *IEEE Trans. Ind. Appl.*, vol. IA–9, No. 3, pp 310–317, May/Jun. 1973.

F. G. Turnbull, "Selected harmonic reduction in static dc–ac inverters," *IEEE Trans. Commun. Elec.*, vol. 83, No. 73, pp 374–378, Jul. 1964.

I. J. Pitel, S. N. Talukdar, and P. Wood, "Characterization of programmed–waveform pulse–width modulation," *IEEE Trans. Ind. Appl.*, vol. IA–16, No. 5, pp. 707–715, Sep./Oct. 1980.

G. S. Buja, "Optimum output waveforms in PWM inverters," *IEEE Trans. Ind. Appl.*, vol. IA–16, No. 6, pp. 830–836, Nov./Dec. 1980.

A. Kernik, D. L. Stechshulte, and D. W. Shireman, "Static Inverter with synchronous output waveform synthesized by time–optimal response feedback," *IEEE Trans. IECI*, vol. IECI–24, No. 4, pp 297–305, Nov. 1977.

A. Kawamura and R. G. Hoft, "Instantaneous feedback controlled PWM inverter with adaptive hysteresis," *IEEE Trans. Ind. Appl.*, vol. IA–20, No. 4, pp. 769–775, Jul./Aug. 1984.

P. Ziogas, "The Delta modulation technique in static PWM inverters," *IEEE Trans. Ind. Appl.*, vol. IA–17, No. 2, pp. 199–204, Mar./Apr. 1981.

K. P Gokhale, A. Kawamura, and R. G. Hoft, "Dead beat microprocessor control of PWM inverter for sinusoidal output waveform synthesis," in *Conf. Rec. 16$^{th}$ Annual IEEE Power Elect. Spec. Conf.*, Jun. 1985, pp. 28–36.

A. Kawamura, T. Haneyoshi, and R. G. Hoft, "Deadbeat controlled PWM inverter with parameter estimation using only voltage sensor," in *Conf. Rec. 17$^{th}$ Annual IEEE Power Elec. Spec. Conf.*, 1986 pp. 576–583, no month.

T. Inoue, M. Nakano, and S. Iwai "High accuracy control of servomechanism for repeated contouring," in *Proc. 10$^{th}$ Annu. Symp. Incremental Motion Contr. Syst. Devices*, 1981, pp. 285–292, No month.

T. Inoue, M. Nakano, T. Kubo, S. Matsumoto and H. Baba "High accuracy control of a proton synchroton magnet power supply," in *IFAC*, vol. 6, Electrical Power Systems, Aug. 1981, pp. 3137–3142.

S. Hara, Y Yamammoto, T. Omata, and M. Nakano, "Repetitive control system: A new type servo system for periodic exogenous signals," *IEEE Trans. Automatic Contr.*, vol. 33, No. 7, pp. 659–666, Jul. 1988.

T. Haneyoshi, A Kawamura, and R. G. Hoft, "Waveform compensation of PWM inverter with cyclic fluctuating loads, " *IEEE Trans. Ind. Appl.*, vol. 24, No. 4, Jul./Aug. 1988, pp. 582–589.

Y. Tzou, S. Jung, and H. Yeh *"Adaptive Repetitive Control of PWM Inverters for Very Low THD AC–Voltage Regulation with Unknown Loads,"* IEEE Transactions on Power Electronics, vol. 14, No. 5, Sep. 1999, pp. 973–981.

Patel et al., "Generalized Techniques of Harmonic Elimination and Voltage Control in thyristor Inverters: Part II—Voltage Control Techniques", IEEE Transactions Ind. Appls. Soc., pp. 666–673, Sep./Oct. 1974.

* cited by examiner

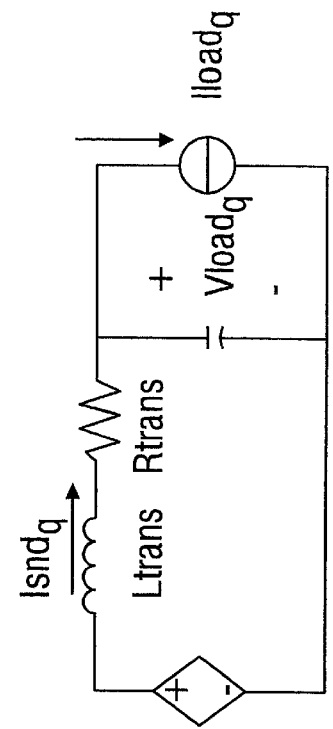
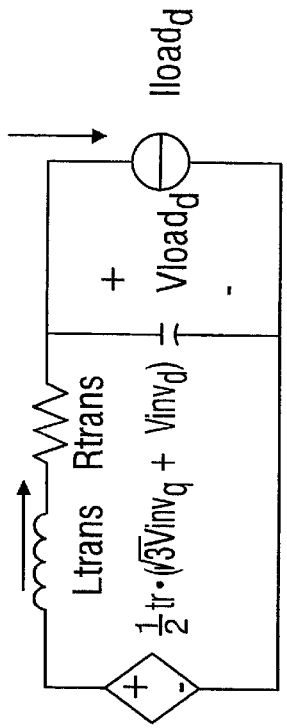
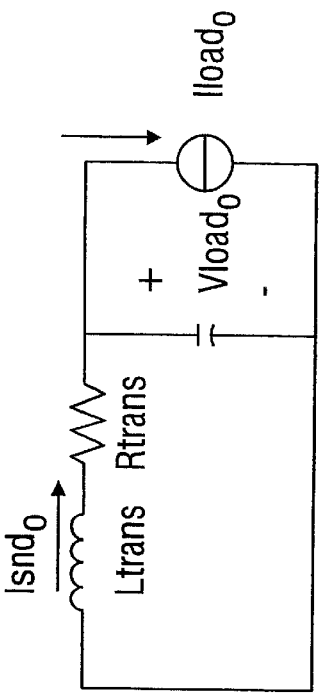
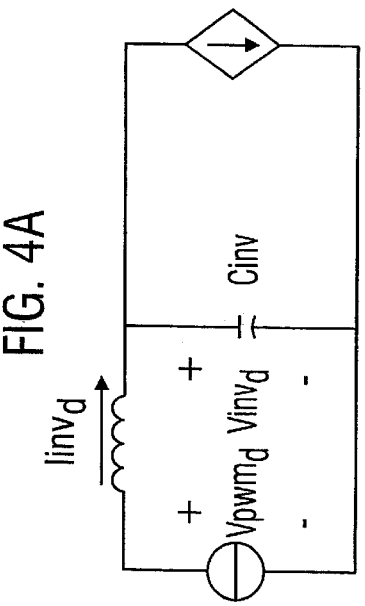
FIG. 4A
FIG. 4B
FIG. 4C
FIG. 4D
FIG. 4E

DIGITAL CONTROL OF VOLTAGE HARMONIC DISTORTION AND OVERLOAD CURRENT PROTECTION FOR INVERTERS

CROSS-REFERENCE TO RELATED APPLICATIONS

This application claims the benefit of U.S. Provisional Application No. 60/182,394, filed Feb. 14, 2000.

BACKGROUND OF THE INVENTION

Techniques for producing low Total Harmonic Distortion in PWM inverters (single-phase or three-phase) have been known to exist in several prior works. In the early days, the carrier-modulated PWM techniques such as the triangular wave comparison type PWM were very popular. For example such techniques are disclosed in: A. Schonung and Stemmler, "Static frequency changes with subharmonic control in conjunction with reversible variable speed drive," *BBC RevI.*, pp. 555–557, August/September 1964; P. D. Ziogas, "Optimum voltage and harmonic control of PWM techniques for three phase static UPS systems," *IEEE Trans. Ind. Appl.*, vol. IA-16, no. 4, pp. 542–446, July/August 1980; and B. K. Bose and H. A. Sutherland, "A high performance pulse-width modulator for an inverter-fed drive system using a microcomputer," in *Conf. Rec. 1982 Ann. Meet. Ind. Appl. Soc.*, pp. 847–853.

Microcomputer based techniques using preprogrammed PWM patterns have also been utilized. For example in: H. S. Patel and R. G. Hoft, "Generalized technique of harmonic elimination and voltage control in thyristor inverter, Part I," *IEEE Trans. Ind. Appl.* vol. IA-9, no. 3, pp. 310–316, March/April 1973; and "Part II, *IEEE Trans. Ind. Appl.*, vol. LA-10, no. 5, pp. 666–673, September/October 1973; F. G. Turnbull, "Selected harmonic reduction in static dc-ac inverters, *"IEEE Trans. Commun. Elec.*, vol. 83, pp. 374–478, July 1964; I. J. Pitel, S. N. Talukdar, and P. Wood, "Characterization of programmed-waveform pulse-width modulation," *IEEE Trans. Ind. Appl.*, vol. IA-16, no. 5, pp. 707–715, September/October 1980; and G. S. Buja, "Optimum output waveforms in PWM inverters, *"IEEE Trans. Ind. Appl.*, vol. IA-16, no. 6, pp. 830–836, November/December 1980.

In these techniques, the switching edges of the PWM pattern are computed to satisfy certain performance requirements; the most common of which is controlling the fundamental component and eliminating specified harmonics. Two main disadvantages of these techniques are: slow voltage regulation response due to average voltage control, and phase displacement between the reference sine wave and the filter output varies with the load.

More recent techniques include the time optimal response switching PWM, disclosed in, for example: A. Kernik, D.L. Stechshulte, and D.W. Shireman, "Static Inverter with synchronous output waveform synthesized by time-optimal response feedback" *IEEE Trans. IECI*, vol. IECI-24, no. 4, pp. 297–305, 1977; A. Kawamura and R. G. Hoft, "Instantaneous feedback controlled PWM inverter with adaptive hysteresis," *IEEE Trans. Ind. Appl.*, vol. IA-20, no. 4, pp. 769–775, July/August 1984; and P. Ziogas, "Delta modulation technique in static PWM inverters," *IEEE Trans. Ind. Appl.*, vol. IA-17, pp. 289–295, 1981. Other recent techniques include the real-time deadbeat-controlled PWM, disclosed in, for example: K. P. Gokhale, A. Kawamura, and R. G. Hoft, "Dead beat microprocessor control of PWM interter for sinusoidal output waveform synthesis," in *Conf. Rec. IEEE Power Elect. Spec. Conf.*, 1985, pp. 28–36 and A. Kawamura, T. Haneyoshi, and R. G. Hoft, "Deadbeat controlled PWM inverter with parameter estimation using only voltage sensor," in Conf Rec. *IEEE Power Elec. Spec. Conf,* 1986. These techniques have very fast response for load disturbances, but it is also known that these systems have a high THD for non-linear load (crest-load).

The voltage control technique proposed in the present invention uses the perfect control of robust servomechanism problem (Perfect RSP) theory developed in Davison, E. J. and Scherzinger, B., "Perfect Control of the robust servomechanism problem", *IEEE Trans. On Automatic Control,* 32 (8), 689–702, 1987 ("Davison et al") to ensure perfect tracking of the output voltages under unknown load by providing means for eliminating errors at specified harmonic and at the same time ensuring good transient response. The theory is based on the internal model principle, proposed by Francis, B. A., and Wonham, W. M., "The internal mode principle for linear multivariable regulators", *Appl. Math. Opt.*, vol. 2, pp. 170–194, which states that asymptotic tracking of controlled variables toward the corresponding references in the presence of disturbances (zero steady state tracking error) can be achieved if the models that generate these references and disturbances are included in the stable closed loop systems. In other words, if we include the frequency modes of the references and the disturbances to be eliminated in the control loop, then the steady state error will not contain these frequency modes.

Applying the internal model principle into the output voltages control in a three-phase PWM inverter means that the fundamental frequency mode (50 Hz or 60 Hz) has to be included in the controller since the references vary at this frequency. Elimination of the voltages errors due to the load currents at other harmonics frequency can then be achieved by including the frequency modes of these harmonics into the controller. The perfect RSP theory combines this internal model principle with the optimal state feedback to guarantee stability of the closed loop system and providing arbitrary good transient response.

Similar techniques that use the internal model principle to achieve very low THD output voltage in single-phase PWM inverters have been reported recently in T. Haneyoshi, A. Kawamura, and R. G. Hoft, "Waveform compensation of PWM inverter with cyclic fluctuating loads, *IEEE Trans. Ind. Appl.*, vol. 24, pp. 582–589, 1988 ("Haneyoshi et al") and Y. Tzou, S. Jung, and H. Yeh, "Adaptive Repetitive Control of PWM Inverters for Very Low THD AC-Voltage Regulation with Unknown Loads ("Tzou et al"). In these papers, the control development follows the repetitive control theory developed in T. Inoue, M. Nakano, and S. Iwai, "High accuracy control of servomechanism for repeated contouring," in *Proc $10^{th}$ Annu. Symp. Incremental Motion Contr. Syst. Devices,* 1981, pp. 258–292; T. Inoue and M. Nakano, "High accuracy control of a proton synchroton magnet power supply," in *IFAC,* vol. 20, 1981, pp. 216–221; and S. Hara, Y. Yamammoto, T. Omata, and M. Nakano, "Repetitive control system: A new type servo system for periodic exogenous signals," *IEEE Trans. Automatic Contr.,* vol. 33, no. 7, pp. 659–666, 1988. Unlike the technique based on the perfect RSP that provides zero steady state error for references or disturbances only at finite specified frequencies, the repetitive control guarantees zero steady state error at all the harmonic frequencies less than half of the sampling period. However, the repetitive control is not easy to stabilize for all unknown load disturbances and cannot obtain very fast response for fluctuating load. In Haneyoshi et al, the latter problem is solved by including a "one sampling ahead preview controller", and Tzou et al enhances the stability result of Haneyoshi et al by providing an adaptive mechanism for unknown load disturbances.

The inventor would like to point out here that, although the perfect RSP used in this disclosure only eliminates voltage harmonic at a finite specified frequencies, the perfect RSP control is still a very suitable control for a three-phase PWM inverters. It is to be emphasized that in a three-phase system, most of the voltage harmonics, like the triplen harmonics ($3^{rd}$, $6^{th}$, $9^{th}$, etc.), are either non-existent, uncontrollable, and/or negligible in values. Therefore, not too many harmonics are left for the control to handle. Moreover, the closed loop stability under unknown load is easier to achieve with the perfect RSP than the repetitive control, and the perfect RSP by itself already provides a good transient response.

The inventor has also successfully combined the perfect RSP control of the voltages harmonics with a fast current controller using a discrete time sliding mode controller, as disclosed in Utkin, V., Guldner, J., Shi, J., *Sliding Mode Control in Electromechanical Systems,* Taylor & Franci, Philadelphia, Pa., 1999, ("Utkin et al") for limiting the inverter currents under overload condition. This is one of the important features necessary for a UPS, which is not addressed in the repetitive control work of Haneyoshi et al and Tzou et al. The discrete sliding mode controller has been chosen because of the fast and no-overshoot response that it provides. The current controller acts as an inner loop to the perfect RSP control of the output voltages in the outer loop. In this case, the perfect RSP voltage control has been designed by accounting for the extra dynamic introduced by the discrete time sliding mode controller. This way, the stability and robustness of the overall control system are still guaranteed.

BRIEF DESCRIPTION OF THE DRAWINGS

FIGS. 4A–4E illustrate equivalent circuits of the inverter in the DQ0 stationary reference frame.

SUMMARY OF THE INVENTION

Figure 1:
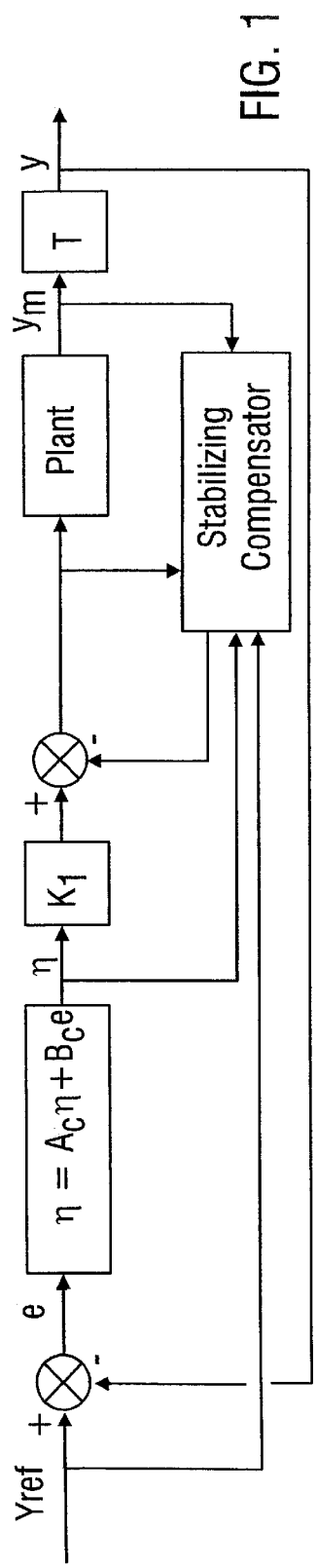
FIG. 1 diagrammatically illustrates a general controller that solves the robust servomechanism problem.

The present invention relates to control techniques, and more particularly to techniques for digitally controlling uninterruptible power supplies. Specifically, the present invention relates to a method for reducing transient overshoot of the output of an uninterruptible power supply.

Particularly, the method of the claimed invention involves operating an analog to digital converter to sample the output signal, e.g., a voltage or a current, at a first time to generate a first sampled output value. The claimed invention further involves operating the analog to digital converter to sample the output signal at a second time to generate a second sampled output value. The period between the first operation of the analog to digital converter and the second analog to digital converter is equal the PWM period of the inverter; i.e., $T_{PWM}$.

The method then involves generating a control input value for the inverter that is equal to 1.5 times the second sampled output value minus 0.5 times the first sampled output value. Once the control input value is determined, a PWM pulse duration is computed as a function of the control input value. A pulse having the computed pulse duration (i.e., a PWM signal) is initiated at a third time. The third time is one-half PWM period after the second sampling time.

DETAILED DESCRIPTION OF A PREFERRED EMBODIMENT

Perfect Control of Robust Servomechanism Problem

Finding a solution to a Robust Servomechanism Problem (RSP) for a system involves finding a controller for the system such that: given a modeled class of unstable tracking/disturbance signals, exact asymptotic tracking/regulation occurs for all plant perturbations that do not produce instability. A perfect controller for the RSP solves the RSP and also provides arbitrarily good transient error, with no unbounded peaking in the error response of the system. Below some of the main results of the perfect RSP discussed in Davison et al are summarized.

Consider the plant to be regulated described by the following equations:

$$\dot{x}=Ax+Bu+Ed \ \ y=Cx+Du+Fd \ \ y_m=C_m x+D_m u+F_m d \ \ e=y_{ref}-y \qquad (1)$$

where $x \in R^n$, $x \in R^m$ are the inputs, $y \in R^r$ are the outputs to be regulated, $y_m \in R^{rm}$ are the measurable outputs, $d \in R^\delta$ are the disturbances, $y_{ref} \in R^r$ are the reference input signals, and $e \in R^r$ are the error in the system. It is assumed that the disturbance d arises from the following class of systems:

$$\dot{\eta}_1=\Psi_1 \eta_1, \ d=C_1\eta_1, \ \eta_1 \in R^{n1} \qquad (2)$$

and the reference input signals $y_{ref}$ arise from the following:

$$\dot{\eta}_2=\Psi_2 \eta_2, \ y_{ref}=C_2\eta_2, \ \eta_2 \in R^{n2} \qquad (3)$$

with $eig(\Theta_1) \subset C^+$ and $eig(\Theta_2) \subset C^+$, where $eig( )$ denotes the eigenvalues and $C^+$ denotes the closed right complex half plane. This class of signals includes most classes of signals that occur in application problems, e.g., constant, polynomial, sinusoidal, polynomial-sinusoidal, etc. Let $\Lambda=\{(\lambda_1, \lambda_2, \ldots, \lambda_p\}$ be the zeros of the least common multiple of minimal polynomial of $\Psi_1\Psi_2$ (multiplicities repeated), then a linear controller that solves the RSP for (1), consists of the following structure:

$$u=\xi+K_1\eta \tag{4}$$

where $\eta\in R^{rp}$ is the outputs of a servo-compensator and $\xi\in R^m$ the output of a stabilizing-compensator S. The servo compensator has the form:

$$\dot{\eta}=A_c\eta+B_c e \tag{5}$$

with $A_c$=block diag $(\Omega,\Omega, \ldots,\Omega)$
$B_c$=block diag$(\gamma,\gamma, \ldots,\gamma)$ and $$\Omega = \begin{bmatrix} 0 & 1 & 0 & \ldots & 0 \\ 0 & 0 & 1 & \ldots & 0 \\ \vdots & \vdots & \vdots & \vdots & \vdots \\ -\sigma_1 & -\sigma_2 & -\sigma_3 & \ldots & -\sigma_p \end{bmatrix}, \gamma = \begin{bmatrix} 0 \\ 0 \\ \vdots \\ 0 \\ 1 \end{bmatrix}$$

where the coefficients $\sigma_i, i=1,2, \ldots, p$ are given by the coefficients of the polynomial $$\prod_{i=1}^{P} (\lambda - \lambda_i); \text{ i.e.,} \tag{6}$$

$$\lambda^P + \sigma_p\lambda^{p-1} + \cdots + \sigma_2\lambda + \sigma_1 := \prod_{i=1}^{P} (\lambda - \lambda_1)$$

The servo compensator gain $K_1$ in (4) and the stabilizing-compensator S should be found to stabilize and "give desired behavior" to the following stabilizable and detectable system:

$$\begin{bmatrix} \dot{x} \\ \dot{n} \end{bmatrix} = \begin{bmatrix} A & 0 \\ -B_c C & A_c \end{bmatrix}\begin{bmatrix} x \\ n \end{bmatrix} + \begin{bmatrix} B \\ -B_c C \end{bmatrix} u \tag{7}$$

$$\begin{bmatrix} y_m \\ \dot{n} \end{bmatrix} = \begin{bmatrix} C_m & 0 \\ 0 & I \end{bmatrix}\begin{bmatrix} x \\ n \end{bmatrix} + \begin{bmatrix} D_m \\ 0 \end{bmatrix} u$$

A general controller that solves the robust servomechanism problem can be diagrammatically shown as in FIG. 1.

Note that, given a modeled class of references/disturbances, the servo-compensator is unique within the class of coordinate transformations and nonsingular input transformations. The stabilizing compensators S are, however, not unique; there are various classes of stabilizing compensators that can be used in a robust servomechanism controller. One of them is the complementary controller where the stabilizing compensator is given by:

$$S:\xi=K_0 x \tag{8}$$

where x can either be the measured states of the system, or the estimates found using an observer (if not all states are measurable). In this case, the control u is given by state feedback found to stabilize the augmented system of the plant and the servo-compensator:

$$\tilde{x} = \tilde{A}\cdot\tilde{x} + \tilde{B}\cdot u \tag{9}$$

$$\tilde{A} = \begin{bmatrix} A & 0 \\ -B_c C & A_c \end{bmatrix}, \tilde{B} = \begin{bmatrix} B \\ -B_c D \end{bmatrix}, \tilde{x} = \begin{bmatrix} x \\ n \end{bmatrix},$$

$$u = K_0 x + K_1 \eta = [K_0 K_1]\tilde{x} := K\cdot\tilde{x}$$

A perfect controller for the robust servomechanism problem can be constructed using Cheap Control method, where the gains $K=[K_0\ K_1]$ are found by minimizing the following performance index:

$$J_\varepsilon = \int_0^\infty (z'z + \varepsilon\cdot u'u)d\tau, z = \tilde{C}\cdot\tilde{x} \tag{10}$$

where $\gamma>0$ is an arbitrarily small scalar. The optimal control gain $K=K_{opt}$, which minimizes this performance index, is given by: $K_{opt}=-1/\varepsilon\tilde{B}'P_{opt}$, where $P_{opt}$ is the unique positive semi-definite solution to the algebraic Riccati equation.

$$\tilde{A}'P_{opt} + P_{opt}\tilde{A} + \tilde{C}'\tilde{C} - \frac{1}{\varepsilon}P_{opt}\tilde{B}\tilde{B}'P_{opt} = 0 \tag{11}$$

Discrete-Time Sliding Mode Control

Discrete time sliding mode controller is an approach in the sliding mode control theory, which is suitable for digital implementation since it does not exhibit the chattering phenomena due to direct digital implementation of continuous time sliding mode control. See Utkin et al.

Consider a continuous linear time invariant system $$\dot{x}(t)=Ax(t)+Bu(t)+Ed(t)y(t)=Cx(t)e(t)=y(t)-y_{ref}(t) \tag{12}$$

with state vector $x(t)\in R^n$, control $u(t)\in R^m$, output to be regulated $y(t)$, reference input $y_{ref}(t)$, and disturbance $d(t)$. System (12) can be transformed to discrete time system with sampling time Ts to yield.

$$x(k+1)=A^*x(k)+B^*u(k)+E^*d(k)y(k)=Cx(k)e(k)=y(k)-y_{ref}(k) \tag{13}$$

where:

$A^*=\exp(A\cdot T_s)$ $B^*=\int_0^{T_s} e^{A\cdot(T_s-\tau)}B\ d\tau$ $E^*=\int_0^{T_s} e^{A\cdot(T_s-\tau)}E\ d\tau$ It is desired to control the output $y(k)$ to follow the reference $y_{ref}(k)$. For this purpose we can choose a sliding mode manifold in the form of: $s(k)=Cx(k)-y_{ref}(k)$ such that when discrete-time sliding mode exists we have $y(k)\rightarrow y_{ref}(k)$. Discrete-time sliding mode exists if the control input $u(k)$ is designed as the solution of:

$$s(k+1)=CA^*x(k)+CB^*u(k)-y_{ref}(k+1)=0 \tag{14}$$

The control law that satisfies (13) is called 'equivalent control' and is given by:

$$u_{eq}(k)=-(CB^*)^{-1}(CA^*x(k)-y_{ref}(k+1)) \tag{15}$$

If the control is limited to a value $u_0$ i.e. $\|u(k)\|\leq u_0$ then the following modified control law can be applied:

$$u(k) = \begin{cases} \vec{u}_{eq}(k) & \text{for } \|\vec{u}_{eq}(k)\| \leq u_0 \\ u_0 \frac{u_{eq}(k)}{\|u_{eq}(k)\|} & \text{for } \|\vec{u}_{eq}(k)\| > u_0 \end{cases} \tag{16}$$

With control law (16), the discrete-time sliding mode exists after a finite number of steps.

The Power Converter System

Figure 2:
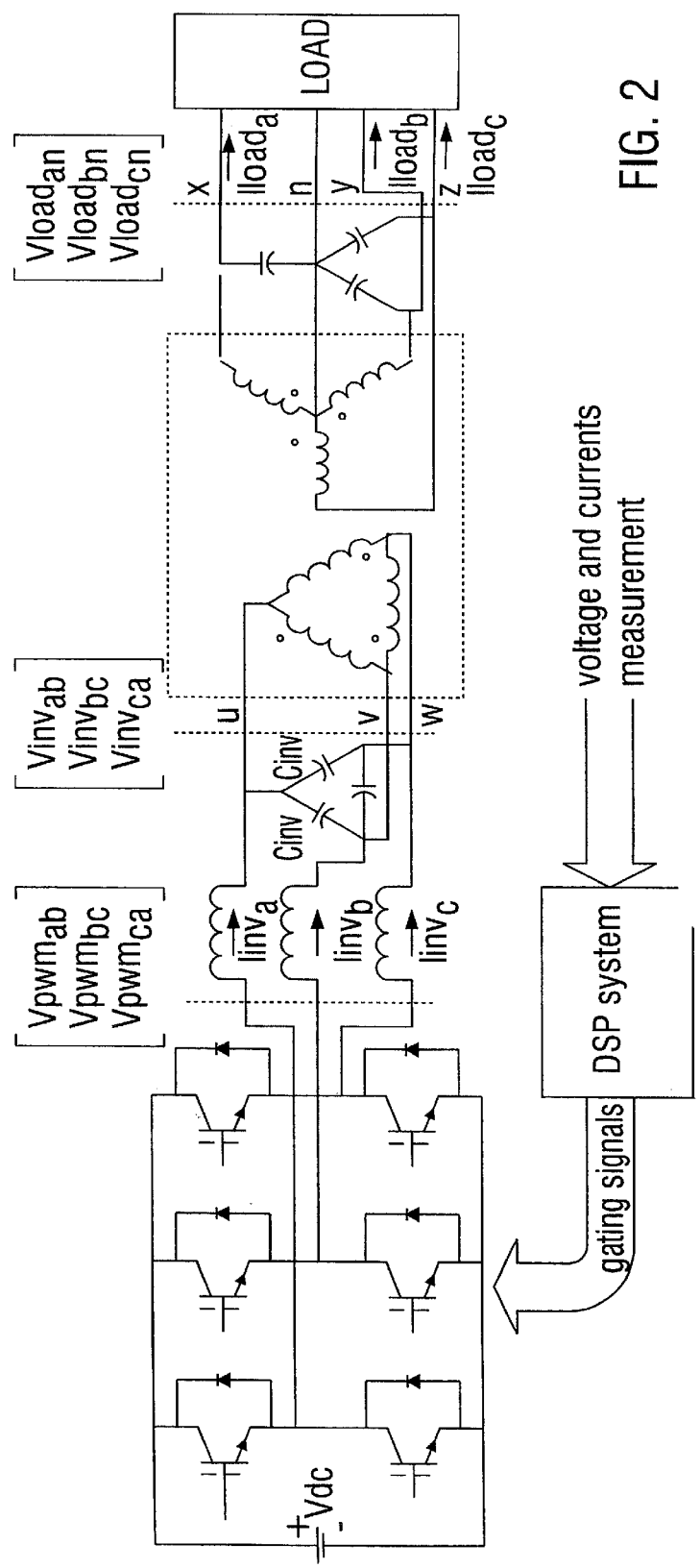
FIG. 2 illustrates a power converter system used with the present invention.

A power converter system to which the controller of the present invention may be applied comprises a typical three-phase PWM voltage inverter with LC output filter (Linv and Cinv) and a delta-wye transformer that act both as a potential transformer and electrical isolation to the load. FIG. 2 shows a circuit diagram of the system. Notice that the delta-wye transformer converts a three-wire (UVW) power system of the inverter to a four-wire (XYZ-N) system for the load. Small capacitors (denoted as Cgrass in FIG. 2) are added at the load side of the transformer to provide further harmonics filtering and stabilization of the load voltages. A DSP (Digital Signal Processor) system controls the operation of the power converter, providing required PWM gating signals to the power II devices. Voltages and currents measured by the DSP system for control purposes are shown labeled in FIG. 2. The line-to-neutral load voltages (at points xyz-n in FIG. 2) are denoted as: $Vload_{an}$, $Vload_{bn}$, and $Vload_{cn}$, the load phase currents as: $Iload_a$, $Iload_b$, and $Iload_c$, the line-to-line inverter capacitor voltages (at points uvw in FIG. 2) as $Vinv_{ab}$, $Vinv_{bc}$, and $Vinv_{ca}$, the inverter phase currents as: $Iinv_a$, $Iinv_b$, and $Iinv_c$.

Figure 3:
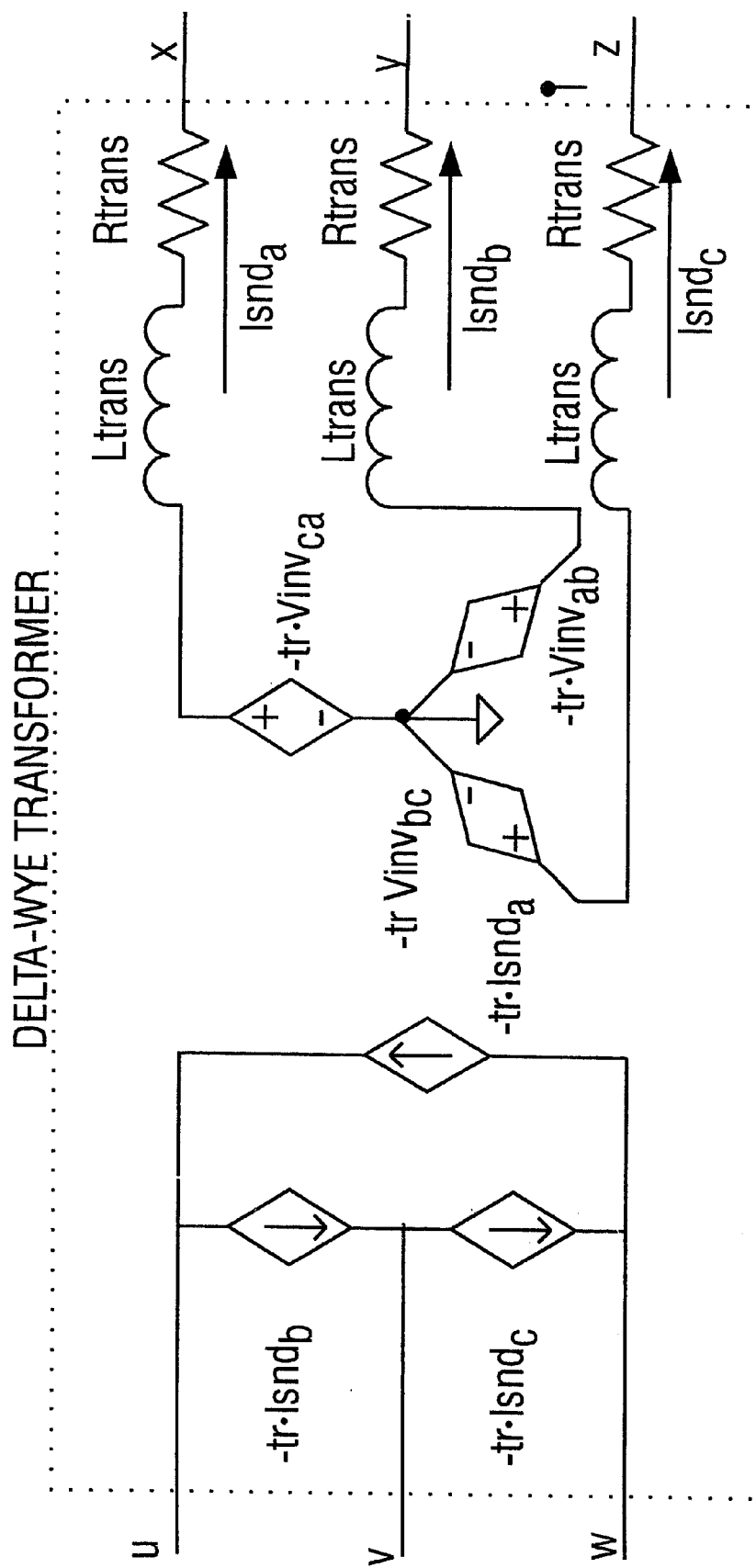
FIG. 3 illustrates each phase of the delta-wye transformer model used in the present invention.

For development of the control algorithm, a state space model of the system is needed. Each phase of the delta-wye transformer has been modeled as an ideal transformer with leakage inductance Ltrans and series resistance Rtrans on the secondary winding as shown in FIG. 3. The secondary transformer currents are denoted as $Isnd_a$, $Isnd_b$, and $Isnd_c$.

Using the transformer model in FIG. 3, the dynamic equations of the output filter circuit in FIG. 2 can be written as in equations (17.a)–(17.d):

$$\frac{d\vec{V}inv_{abc}}{dt} = \frac{1}{3 \cdot C_{inv}} \vec{I}inv_{abc} - \frac{1}{3 \cdot C_{inv}} Tr_i \cdot \vec{I}snd_{abc} \quad (17.a)$$

$$\frac{d\vec{I}inv_{abc}}{dt} = \frac{1}{L_{inv}} \vec{V}pwm_{abc} - \frac{1}{L_{inv}} \vec{V}inv_{abc} \quad (17.b)$$

$$\frac{d\vec{V}load_{abc}}{dt} = \frac{1}{C_{load}} \vec{I}snd_{abc} - \frac{1}{C_{load}} \vec{I}load_{abc} \quad (17.c)$$

$$\frac{d\vec{I}snd_{abc}}{dt} = \frac{R_{trans}}{L_{tran}} \vec{I}snd + \frac{1}{L_{tran}} Tr_v \cdot \vec{V}inv_{abc} - \frac{1}{L_{tran}} \vec{V}load_{abc} \quad (17.d)$$

where the voltages and currents vectors are defined as in (18).

$\vec{V}inv_{abc} = [Vinv_{ab}\ Vinv_{bc}\ Vinv_{ca}]^T$ $\vec{V}load_{abc} = [Vload_a\ Vload_b\ Vload_c]^T$, $\vec{I}load_{abc} = [Iload_a\ Iload_b\ Iload_c]^T$, $\vec{I}snd_{abc} = [Isnd_a\ Isnd_b\ Isnd_c]^T$, $\vec{I}inv_{abc} = [Iinv_{ab}\ Iinv_{bc}\ Iinv_{ca}]^T = [Iinv_a - Iinv_b\ Iinv_b - Iinv_c\ Iinv_c - Iinv_a]^T$ (18)

Matrices $Tr_i$ and $Tr_v$ in equation (17.a) and (17.d) denote the currents and voltages transformations of the delta-wye transformer. Denoting the transformer's turn ratio as tr, these matrices are given by (19):

$$Tr_i = tr \cdot \begin{bmatrix} 1 & -2 & 1 \\ 1 & 1 & -2 \\ -2 & 1 & 1 \end{bmatrix}, \quad Tr_v = tr \cdot \begin{bmatrix} 0 & 0 & -1 \\ -1 & 0 & 0 \\ 0 & -1 & 0 \end{bmatrix} \quad (19)$$

To obtain a state space model of the system, the dynamic equations in (17) are transformed to DQ0 stationary reference frame using the transformation:

$$\vec{f}_{qd0} = K_S \cdot \vec{f}_{abc}, \quad (20)$$

with $$K_S = \frac{2}{3} \begin{bmatrix} 1 & -0.5 & -0.5 \\ 0 & -\sqrt{3/2} & \sqrt{3/2} \\ 0.5 & 0.5 & 0.5 \end{bmatrix},$$

$$f_{qd0} = [f_q, f_d, f_0]^T, \quad f_{abc} = [f_a, f_b, f_c]^T$$

where $\vec{f}_{qd0}$ denotes the abc voltages and currents defined in (18), and $\vec{f}_{qd0}$ the corresponding DQ0 stationary reference frame variables. The circuit dynamics can then be written as in (21):

$$\frac{d\vec{V}inv_{qd}}{dt} = \frac{1}{3 \cdot C_{inv}} \vec{I}inv_{qd} - \frac{1}{3 \cdot C_{inv}} Tri_{qd0} \cdot \vec{I}snd_{qd0} \quad (21.a)$$

$$\frac{d\vec{I}inv_{qd}}{dt} = \frac{1}{L_{inv}} \vec{V}pwm_{qd} - \frac{1}{L_{inv}} \cdot \vec{V}inv_{qd} \quad (21.b)$$

$$\frac{d\vec{V}load_{qd0}}{dt} = \frac{1}{C_{load}} \vec{I}snd_{qd0} - \frac{1}{C_{load}} \cdot \vec{I}load_{qd0} \quad (21.c)$$

$$\frac{d\vec{I}snd_{qd0}}{dt} = \frac{R_{tran}}{L_{tran}} \vec{I}snd_{qd0} + \frac{1}{L_{tran}} Trv_{qd} \cdot \vec{V}inv_{qd} - \frac{1}{L_{tran}} \vec{V}load_{qd0} \quad (21.d)$$

where the matrices $Tri_{qd0}$ and $Trv_{qd}$ are defined as:

$$Tri_{qd0} = [K_s \cdot Tr_i \cdot K_S^{-1}]_{row1,2} = tr \cdot \frac{3}{2} \begin{bmatrix} 1 & \sqrt{3} & 0 \\ -\sqrt{3} & 1 & 0 \end{bmatrix} \quad (22.a)$$

$$Trv_{qd} = [K_s \cdot Tr_v \cdot K_S^{-1}]_{col1,2} = tr \cdot \frac{1}{2} \begin{bmatrix} 1 & -\sqrt{3} \\ -\sqrt{3} & 1 \\ 0 & 0 \end{bmatrix} \quad (22.b)$$

Notice that, due to the three-wire system of the inverter and filter, the zero components of the inverter voltages ($\vec{V}inv_{qd}$), the inverter currents ($\vec{I}inv_{qd}$) and the input PWM voltages ($\vec{V}pwm_{qd}$) are trivial and they do not appear in (21).

Using the dynamic equations in (21), equivalent circuits can be drawn in the DQ0 stationary reference frame as shown in FIGS. 4A–4E. From FIGS. 4A–4E it can be seen that the 0-axis equivalent circuit of the load-side of the transformer is completely de-coupled from the qd-axis equivalent circuits. This shows that the zero components of the load voltages and the secondary transformer currents ($Vload_0$ and $Isnd_0$) are uncontrollable by the input PWM voltages ($\vec{V}pwm_{qd}$). A linear controllability analysis performed to (21) can also be used to show this fact. The 0-component of the load currents will be non-zero under unbalanced load condition or under non-linear load in the form of triplen harmonics. Because these 0-components are uncontrollable, no action can be done by the control to compensate them. However, as is apparent from FIGS. 4A–4E, the small capacitor at the output along with the leakage inductance of the transformer act as an LC filter which can be tuned to provide attenuation to the effect of the 0-component of the load voltages. From FIGS. 4A–4E, the amount of this attenuation at steady state can be calculated from:

$$|Vload_0(j\omega)| = \left| \frac{j\omega \cdot L_{trans} + R_{trans}}{1 - \omega^2 L_{trans} C_{grass} + j\omega \cdot R_{trans} C_{grass}} \right| \cdot |Iload_0(j\omega)| \quad (23)$$

where $\omega = 2\pi f$ and f is a harmonic frequency of interest.

Control System Development

Figure 5:
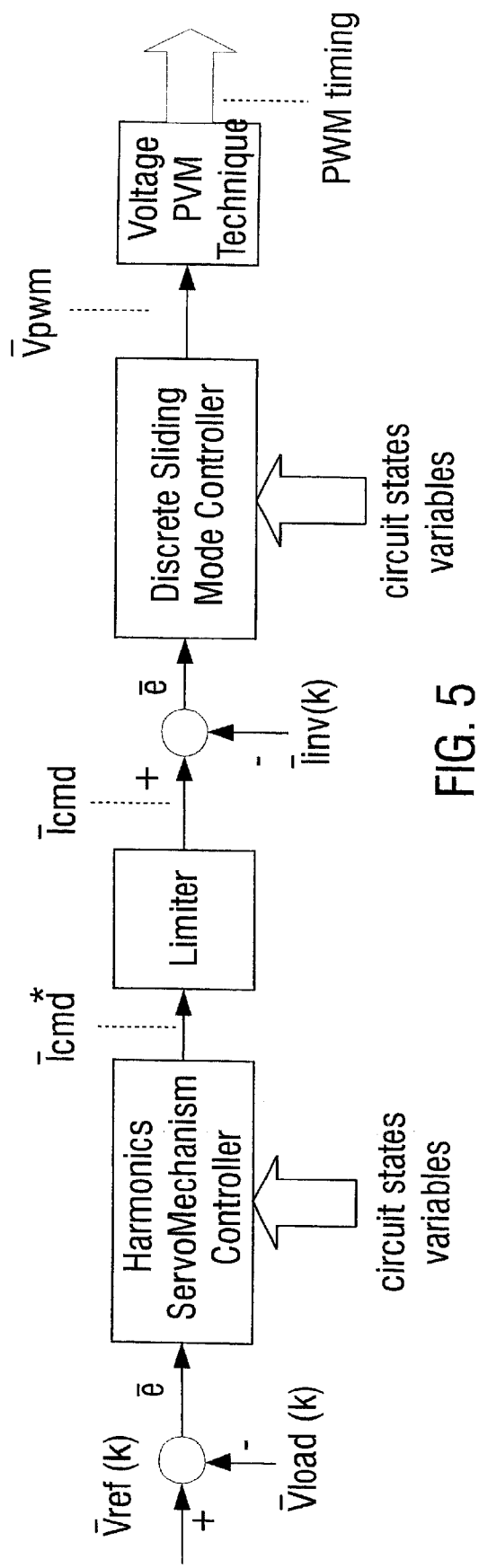
FIG. 5 illustrates a control strategy using a two-loop control structure, an inner inverter currents loop and an outer load voltages loop, in accordance with the present invention.

To achieve fast current limiting capability for the inverter, the control strategy uses a two-loop control structure; an inner inverter currents loop and an outer load voltages loop as shown in FIG. 5. The outer loop regulates the load voltages ($\vec{V}load_{qd}$) to follow 50/60 Hz balanced three-phase voltages references ($\vec{V}ref_{qd}$) and generates the inverter currents commands ($\vec{I}cmd_{qd}$), which are limited. The inner loop in turn generates the PWM voltage commands to regulate the inverter currents to follow the inverter current command. A standard voltage space vector algorithm is then used to realize these PWM command voltages. Notice that the 0-components of the load voltages are not regulated by the control, since it is uncontrollable.

Figure 6:
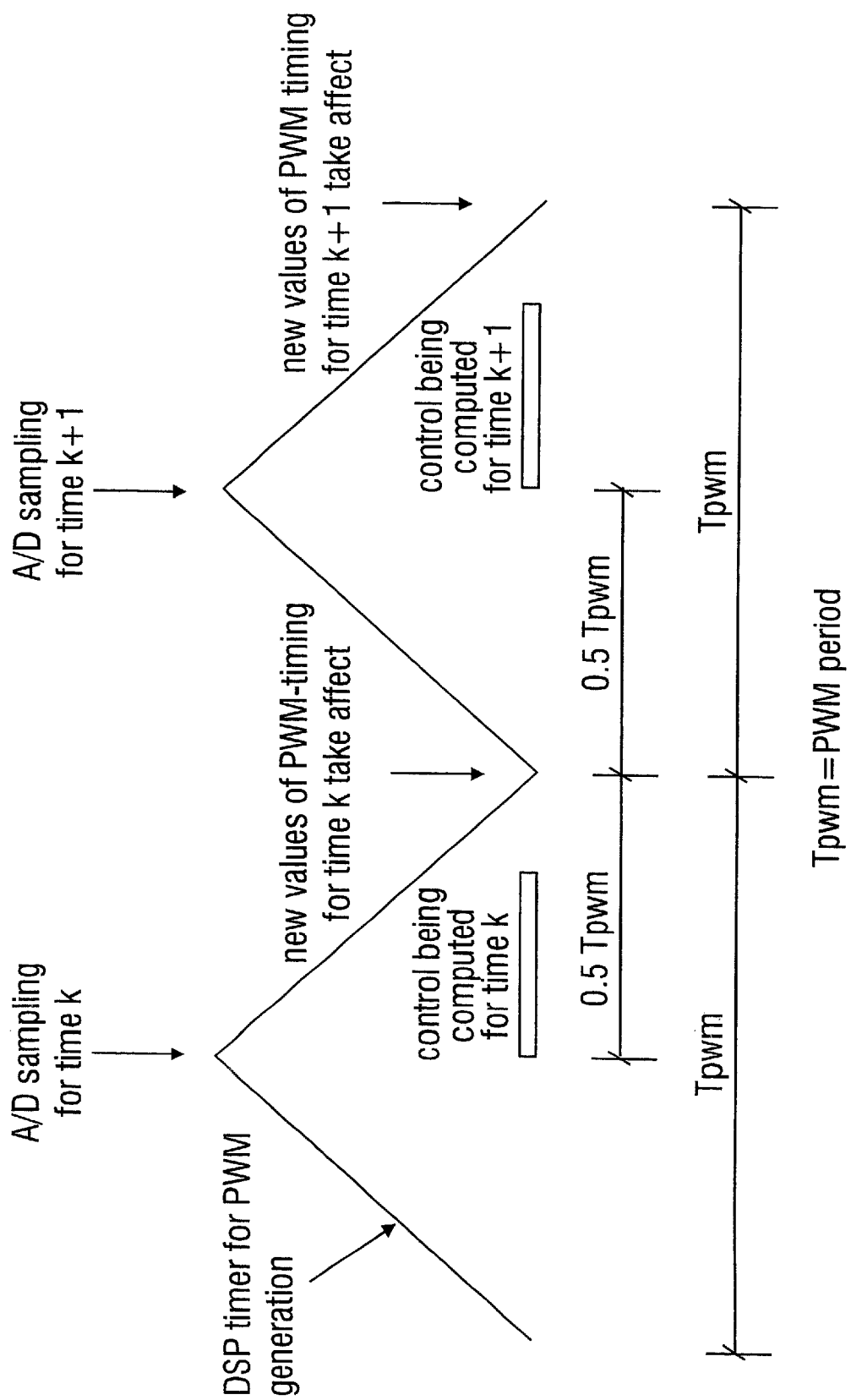
FIG. 6 shows the timing diagram of the PWM gating signals generation in relation with the A/D sampling time of the DSP.

FIG. 6 shows the timing diagram of the PWM gating signals generation in relation with the A/D sampling time of the DSP. It can be seen that there is a one-half PWM period delay between the time the signals are sampled by the A/D and the time the PWM control action is applied.

The next two subsections summarize the development of the two control loops, the inner current loop using the discrete sliding mode controller and the voltage control loop using the robust servomechanism principles.

Discrete-Time Sliding Mode Current Controller

For designing the discrete time sliding mode current controller, consider the intverter and filter subsystem with no transformer and load dynamics:

$$\frac{d\vec{V}inv_{qd}}{dt} \doteq \frac{1}{3 \cdot C_{inv}} \vec{I}inv_{qd} - \frac{1}{3 \cdot C_{inv}} Tri_{qd0} \cdot \vec{I}snd_{qd0} \quad (24.a)$$

$$\frac{d\vec{I}inv_{qd}}{dt} = \frac{1}{L_{inv}} \vec{V}pwm_{qd} - \frac{1}{L_{inv}} \vec{V}inv_{qd}. \quad (24.b)$$

Assuming the secondary transformer currents $\vec{I}snd_{qd0}$ as disturbances, this subsystem can be written in state space form as:

$$\dot{\vec{x}} = A_1 \vec{x}_1 + B_1 \vec{u} + \vec{E}_1 d \quad (25)$$

$$\vec{A}_1 = \begin{bmatrix} \vec{0}_{2\times 2} & (3 \cdot C_{inv})^{-1} \cdot \vec{I}_{2\times 2} \\ -(L_{inv})^{-1} \cdot \vec{I}_{2\times 2} & \vec{0}_{2\times 2} \end{bmatrix},$$

$$\vec{B}_1 = \begin{bmatrix} \vec{0}_{2\times 2} \\ (L_{inv})^{-1} \cdot \vec{I}_{2\times 2} \end{bmatrix},$$

$$\vec{E}_1 = \begin{bmatrix} -(3 \cdot C_{inv})^{-1} \cdot Tri_{qd0} \\ \vec{0}_{2\times 3} \end{bmatrix},$$

where the states are $\vec{x} = [\vec{V}inv_{qd}, \vec{I}inv_{qd}]$ the inputs $\vec{u} = \vec{V}pwm_{qd}$ and disturbances $\vec{d}_1 = \vec{I}snd_{qd}$.

The discrete form 25 can be calculated as:

$$\vec{x}_1(k+1) = A_1^* \vec{x}_1(k) + B_1^* \vec{u}(k) + E_1^* \vec{d}_1(k) \quad (4.2)$$

where $$A_1^* = \exp(A \cdot T_S) B_1^* = \int_0^{T_S} e^{A_1 \cdot T_S} B_1 d\tau E_1^* = \int_0^T e^{A_1 \cdot T} E_1 d\tau$$

and $T_S$ is the A/D sampling time, which in this case is equal to the PWM period $T_{pwm}$ To force the inverter currents to follow their commands, the sliding mode surface is chosen as: $\vec{s}(k) = C_1 \cdot \vec{x}_1(k) - \vec{I}cmd(k)$ where $C_1 \cdot \vec{x}_1(k) = \vec{I}inv_{qd}(k)$, so that when discrete sliding mode occurs, we have $\vec{s}(k) = 0$ or $\vec{I}inv(k) = \vec{I}cmd(k)$. The existence of the discrete sliding mode can be guaranteed if the control is given:

$$u(k) = \begin{cases} \vec{u}_{eq}(k) & \text{for } \|\vec{u}_{eq}(k)\| \leq u_0 \\ u_0 \frac{\vec{u}_{eq}(k)}{\|\vec{u}_{eq}(k)\|} & \text{for } \|\vec{u}_{eq}(k)\| > u_0 \end{cases} \quad (26)$$

where the equivalent control input $\vec{u}_{eq}(k)$ is calculated from:

$$\vec{u}_{eq}(k) = (C_1 B_1^*)^{-1} (\vec{I}cmd_{qd} - C_1 A_1^* \vec{x}_1(k) - C_1 E_1^* \vec{d}_1(k)) \quad (27)$$

and $u_0$ denotes the maximum value of the PWM voltage command realizable by the space vector algorithm.

Note that the secondary transformer currents are needed for the control, but these currents are not measured in the system (see FIG. 2). A linear Luenberger observer can be easily designed to estimate these currents for control purposes. However, in most practical cases we can approximate these currents with the load currents (i.e., $\vec{I}snd_{qd} = \vec{I}load_{qd}$) because the currents through the output capacitor filters are small. According to the inventor's experience, the effect of using this approximation is unnoticeable in the control performance.

Due to the computation delay of the DSP, the control action given by (27) will result in undesirable overshoots during transients. This effect can be minimized, however, if the states $\vec{x}_1(k)$ and disturbances $\vec{d}_1(k)$ are replaced with their first order one-half step ahead predicated values given by:

$$\vec{x}_1^P(k) = 1.5 \cdot \vec{x}_1(k) - 0.5 \cdot \vec{x}_1(k-1) \vec{d}_1^P(k) = 1.5 \cdot \vec{d}_1(k) - 0.5 \cdot \vec{d}_1(k-1) \quad (28)$$

The equivalent control input $\vec{u}_{eq}(k)$ then becomes:

$$\vec{u}_{eq}(k) = (C_1 B_1^*)^{-1} (\vec{I}cmd_{qd} - C_1 A_1^* \vec{x}_1^P(k) - C_1 E_1^* \vec{d}_1^P(k)) \quad (29)$$

Voltage Controller Design Using Discrete Perfect RSP

The voltage control loop designed in this research is based on the discrete form of the technique developed in Davison et al discussed above. To design the load voltages controller, first consider the entire plant system with the 0-components of the voltages and currents omitted as given in (30). As explained in above, these 0-components are completely de-coupled and uncontrollable from the inputs, and therefore are not useful to be included in the design. In the system (30), an input delay of one-half the PWM period ($0.5T_{pwm}$) has been explicitly included to account for the computation delay of the DSP.

$$\vec{x}_p(t) = A_p \vec{x}_p(t) + B_p \vec{u}(t - 0.5T_{pwm}), \tag{30}$$

$$\vec{A}p = \begin{bmatrix} \vec{0}_{2\times 2} & (3\cdot C_{inv})^{-1}\cdot \vec{I}_{2\times 2} & \vec{0}_{2\times 2} & (3\cdot C_{inv})^{-1}\cdot \hat{T}ri_{qd} \\ (-L_{inv})^{-1}\cdot \vec{I}_{2\times 2} & \vec{0}_{2\times 2} & \vec{0}_{2\times 2} & \vec{0}_{2\times 2} \\ \vec{0}_{2\times 2} & \vec{0}_{2\times 2} & \vec{0}_{2\times 2} & (C_{load})^{-1}\cdot \vec{I}_{2\times 2} \\ (L_{inv})^{-1}\cdot \hat{T}rv_{qd} & \vec{0}_{2\times 2} & (-L_{inv})^{-1}\cdot \vec{I}_{2\times 2} & -R_{trans}(L_{trans})^{-1}\cdot \vec{I}_{2\times 2} \end{bmatrix}$$

$$Bp = \begin{bmatrix} \vec{0}_{2\times 2} \\ (L_{inv})^{-1}\cdot \vec{I}_{2\times 2} \\ \vec{0}_{2\times 2} \\ \vec{0}_{2\times 2} \end{bmatrix}, \quad \hat{T}ri_{qd} = tr\cdot \frac{3}{2}\begin{bmatrix} 1 & \sqrt{3} \\ -\sqrt{3} & 1 \end{bmatrix} \hat{T}rv_{qd} = tr\cdot \frac{1}{2}\begin{bmatrix} 1 & -\sqrt{3} \\ \sqrt{3} & 1 \end{bmatrix}$$

The states variables for the system (30) are chosen as $\vec{x}_p = [\vec{V}inv_{qd}, \vec{I}inv_{qd}, \vec{V}load_{qd}, \vec{I}snd_{qd}]$, with the inputs as $u = \vec{V}pwm_{qd}$. System (30) can be transformed to a discrete-time system with sampling time $Ts = T_{pwm}$ to yield:

$$\vec{x}_p(k+1) = \Phi \cdot \vec{x}_p(k) + \Gamma_1 \cdot u(k-1) + \Gamma_2 \cdot \vec{u}(k) \tag{31}$$

where $$\Phi = e^{A_p T_S}, \quad \Gamma_1 = \int_{0.5T_S}^{T_S} e^{A_p \tau} B_p \, d\tau, \quad \Gamma_2 = \int_0^{0.5T_S} e^{A_p \tau} B_p \, d\tau$$

Discrete time system (31) can be written in a standard discrete time state space equations by adding the extra states: $\vec{x}_a(k) = \vec{u}(k-1) = \vec{V}pwm_{qd}(k-1)$ to yield:

$$\begin{bmatrix} \vec{x}_p(k+1) \\ \vec{x}_a(k+1) \end{bmatrix} = \begin{bmatrix} \Phi & \Gamma_1 \\ \vec{0}_{2\times 2} & \vec{0}_{2\times 2} \end{bmatrix} \cdot \begin{bmatrix} \vec{x}_p(k) \\ \vec{x}_a(k) \end{bmatrix} + \begin{bmatrix} \Gamma_2 \\ \vec{I}_{2\times 2} \end{bmatrix} \cdot \vec{u}(k) \tag{32}$$

so that the system can be written as:

$$\vec{x}_p^*(k+1) = A_p^* \vec{x}_p^*(k) + B_p^* \vec{u}(k) \tag{33}$$

where $$\vec{x}_p^*(k) = \begin{bmatrix} \vec{x}_p(k) \\ \vec{x}_p(k) \end{bmatrix}, \quad A_p^* = \begin{bmatrix} \Phi & \Gamma_1 \\ \vec{0}_{2\times 2} & \vec{0}_{2\times 2} \end{bmatrix}, \quad B_p^* = \begin{bmatrix} \Gamma_2 \\ \vec{I}_{2\times 2} \end{bmatrix}$$

To design the voltage controller, we need to consider the true plant (33) and the discrete time sliding mode current controller as the equivalent 'plant' as seen by the outer voltage loop. Using equation (27) and (33) the augmented true plant and discrete sliding mode current controller can be found as in (34).

$$\vec{x}_p^*(k+1) = A_d \vec{x}_p^*(k) + B_d \vec{u}_1(k) \tag{34}$$

with $\vec{u}_1(k) = \vec{I}cmd_{qd}^*(k)$, and $$A_d = A_p^* - B_p^*(C_1 B_1^*)^{-1}(C_1 A_1^* C_{11} + C_1 E_1^* C_{12})$$

$$B_d = B_p^*(C_1 B_1^*)^{-1}$$

-continued $$C_{11} = \begin{bmatrix} \vec{I}_{2\times 2} & \vec{0}_{2\times 2} & \vec{0}_{2\times 2} & \vec{0}_{2\times 2} & \vec{0}_{2\times 2} \\ \vec{0}_{2\times 2} & \vec{I}_{2\times 2} & \vec{0}_{2\times 2} & \vec{0}_{2\times 2} & \vec{0}_{2\times 2} \end{bmatrix}$$

$$C_{12} = \begin{bmatrix} \vec{0}_{2\times 2} & \vec{0}_{2\times 2} & \vec{0}_{2\times 2} & \vec{I}_{2\times 2} & \vec{0}_{2\times 2} \end{bmatrix}$$

Note that the augmented system given in (34) was found assuming the approximation $\vec{I}snd_{qd} \approx \vec{I}load_{qd}$ has been used.

Now, assume $\omega_i = 2\pi f_i$ $i=1,2,\ldots n$ are frequencies of the reference voltages and harmonics to be eliminated. For a 60-Hz UPS system with desire to eliminate $5^{th}$ and $7^{th}$ harmonics, for example, we use $\omega_1 = 2\pi \cdot 60$, $\omega_2 = 2\pi \cdot 5 \cdot 60$, and $\omega_3 = 2\pi \cdot 7 \cdot 60$. We can then choose the servo-compensator to be of the form (35):

$$\dot{\vec{\eta}} = A_c \vec{\eta} + B_c e_{Vqd} \quad \vec{e}_{Vqd} = \vec{V}ref_{qd} - \vec{V}load_{qd} \tag{35}$$

where $$\vec{\eta} = [\vec{\eta}_1, \vec{\eta}_2, \ldots \vec{\eta}_n]^T \quad \vec{\eta}_i \in R^4, i=1,2,\ldots n \; A_c = \text{block diag}[Ac_1, Ac_2, \ldots, Ac_n] B_c = [Bc_1, Bc_2, \ldots, Bc_n]^T$$

with $$Ac_i = \begin{pmatrix} \vec{0}_{2\times 2} & \vec{I}_{2\times 2} \\ -\omega_i^2 \vec{I}_{2\times 2} & \vec{0}_{2\times 2} \end{pmatrix}, \quad i=1,2,\ldots n$$

$$Bc_i = \begin{pmatrix} \vec{0}_{2\times 2} & \vec{I}_{2\times 2} \end{pmatrix}^T \; i=1,2,\ldots n$$

Note that each of the blocks $\dot{\vec{\eta}}_i = Ac_1 \vec{\eta}_i + Bc_i \vec{e}_{Vqd}$ represents a state space implementation of the continuous transfer function $1/(s^2 + \omega i^2)$ for each of the qd-axis voltages errors.

The servo compensator (35) can be transformed to a discrete time system to yield:

$$\vec{\eta}(k+1) = A_c^* \vec{\eta}(k) + B_c^* \vec{e}_{Vqd}(k), \quad \vec{e}_{Vqd}(k) = \vec{V}\text{ref}_{qd}(k) - \vec{V}\text{load}_{qd}(k) \quad (36)$$

where $$A_c^* = \exp(A_c \cdot T_s) B_c^* = \int_0^{T_s} e^{A_1 \cdot (T_S - \tau)} B_c d\tau$$

Now that we have determined the 'plant' and the servo compensator, the control input for the perfect robust servomechanism controller is given by:

$$\vec{u}_1(k) = \vec{I}\text{cmd}_{qd}^*(k) = K x_p^*(k) + K_1 \eta(k) \quad (37)$$

where the gains K $[K_0 \; K_1]$ are found by minimizing the discrete performance index:

$$J_c = \sum_{k=0}^{\infty} (z(k)' z(k) + \varepsilon \cdot u(k)' u(k)), \quad (38)$$

$$z = \begin{bmatrix} x_p^* \\ \eta \end{bmatrix}$$

for the augmented 'equivalent plant' (34) and the servo compensator (36):

$$\begin{bmatrix} \vec{x}_p^*(k+1) \\ \eta(k+1) \end{bmatrix} = \begin{bmatrix} Ad & 0 \\ -B_c^* C & A_c^* \end{bmatrix} \begin{bmatrix} \vec{x}_p^*(k) \\ \eta(k) \end{bmatrix} + \begin{bmatrix} B_d \\ -B_c^* D \end{bmatrix} u_1(k) \quad (39)$$

where $\epsilon > 0$ is an arbitrarily small scalar.

Current Limit and Control Saturation Handling

The current command $\vec{I}\text{cmd}_{qd}^*(k)$ generated by the robust servomechanism voltage controller above is limited in magnitude as in (40) to yield the current command $\vec{I}\text{cmd}_{qd}^*(k)$, which will be implemented by the inner loop current controller.

$$\vec{I}cmd_{qd}(k) = \begin{cases} \vec{I}cmd_{qd}^*(k) & \text{if } |\vec{I}cmd_{qd}^*(k)| \leq I_{max} \\ \dfrac{\vec{I}cmd_{qd}^*(k)}{|\vec{I}cmd_{qd}^*(k)|} I_{max} & \text{if } |\vec{I}cmd_{qd}^*(k)| > I_{max} \end{cases} \quad (40)$$

$I_{max}$ represents the maximum allowable magnitude of the inverter currents. Equation (40) limits the magnitude of the current commands but maintains their vector directions in the qd space.

The states $\vec{\eta}_i$ of the servo-compensator can be seen as sine wave signal generators that get excited by the harmonic contents of the error signals at frequency $\omega_i$. When the control inputs of the robust servomechanism voltage controller saturate i.e., $|\vec{I}\text{cmd}_{qd}^*(k)| > I_{max}$ the servo-compensator states will grow in magnitude due to the break in the control loop. This problem is similar to the integrator windup problem that occurs in an integral type controller. To prevent this, the servo-compensator in (36) can be modified as follows:

$$\vec{\eta}(k+1) = A_c^* \vec{\eta}(k) + B_c^* \vec{e}_1(k), \quad (41)$$

$$\vec{e}_1(k) = \begin{cases} \vec{e}_{Vqd}(k) & \text{if } |\vec{I}cmd_{qd}^*| \leq I_{max} \\ 0 & \text{if } |\vec{I}cmd_{qd}^*| < I_{max} \end{cases}$$

Figure 7:
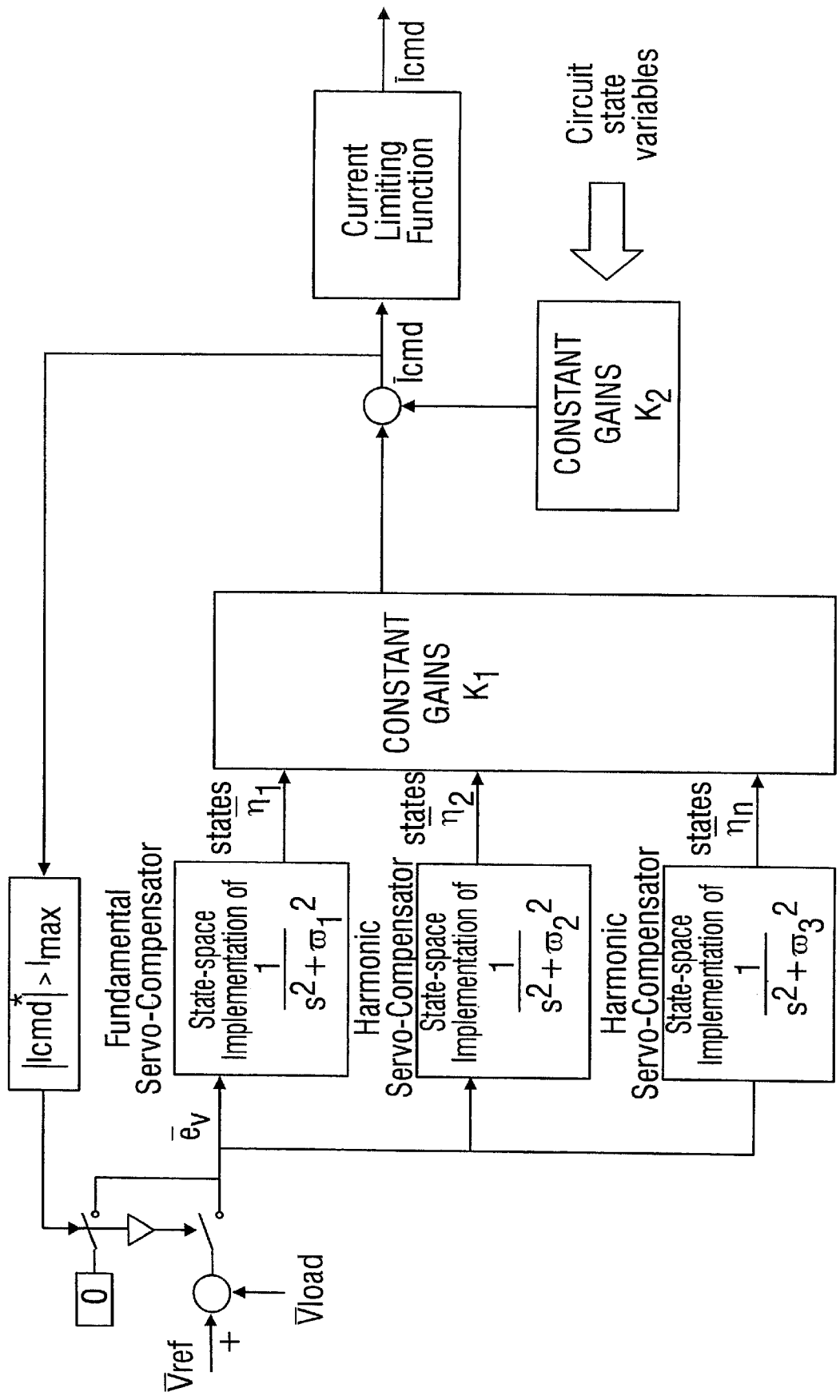
FIG. 7 illustrates the robust servomechanism controller structure during current limit saturation.
Figure 8A:
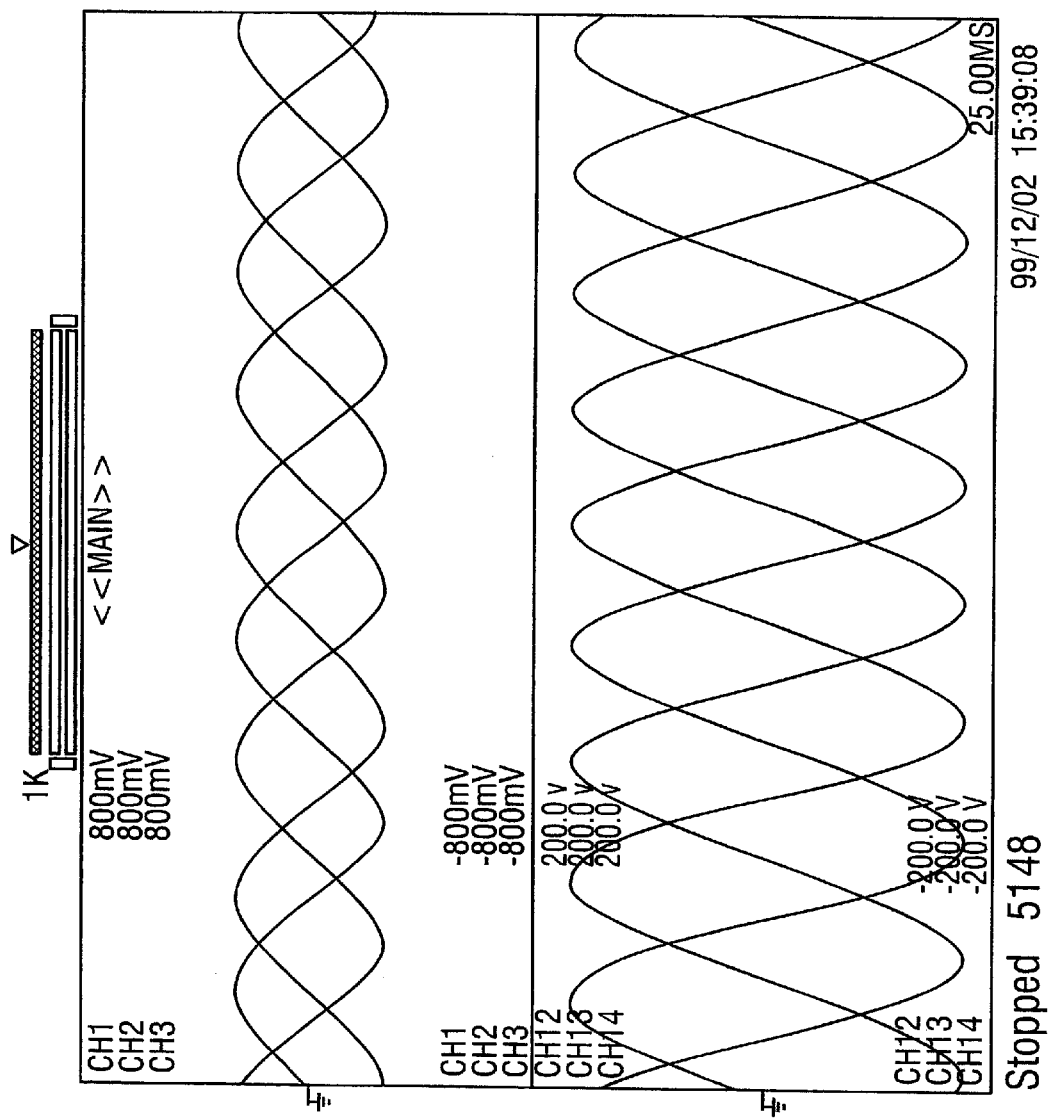
FIGS. 8A–8D shows the waveforms of the load currents, load voltages, and inverter voltages under various linear loads: resistive, inductive, balanced, and unbalanced load.
Figure 8B:
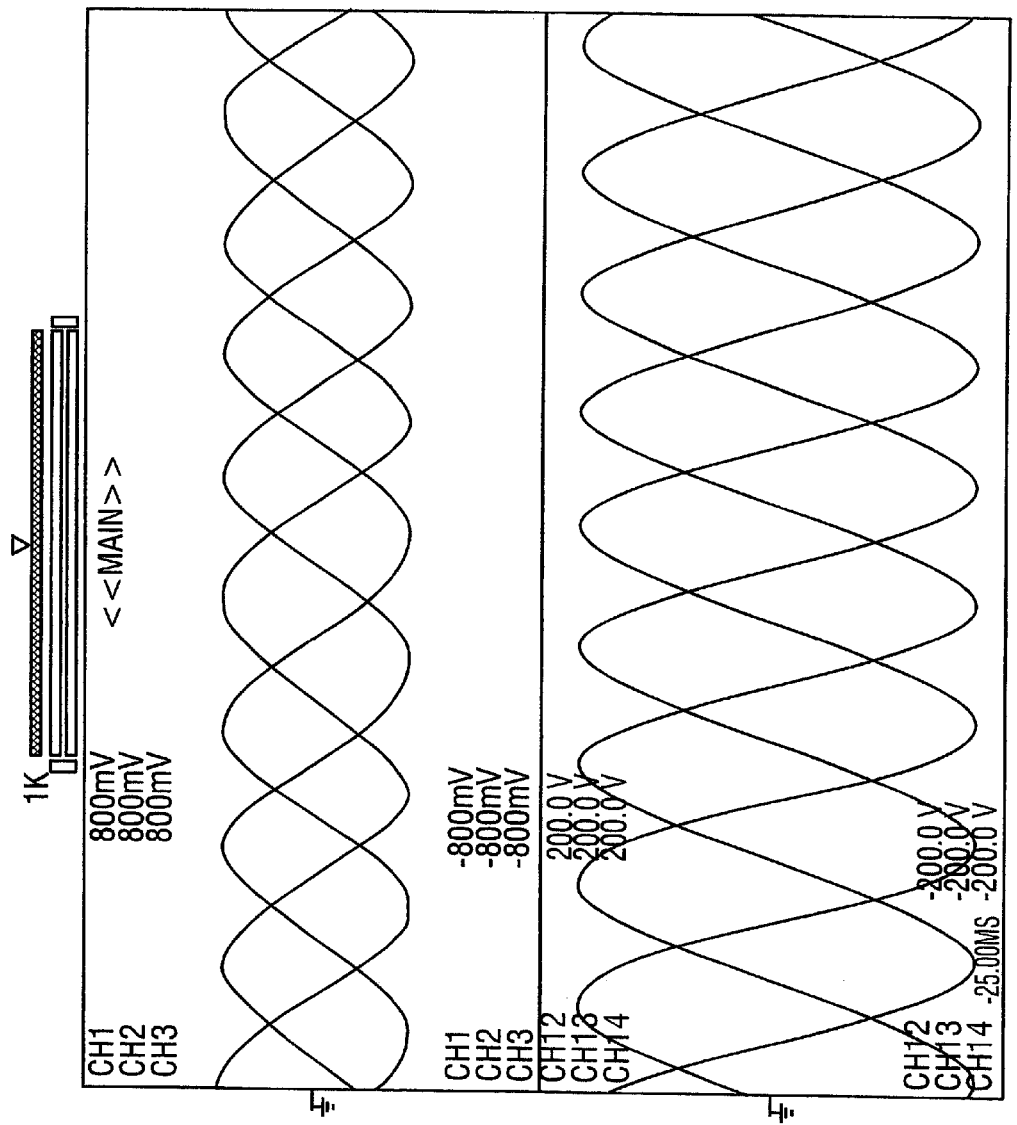
Figure 8C:
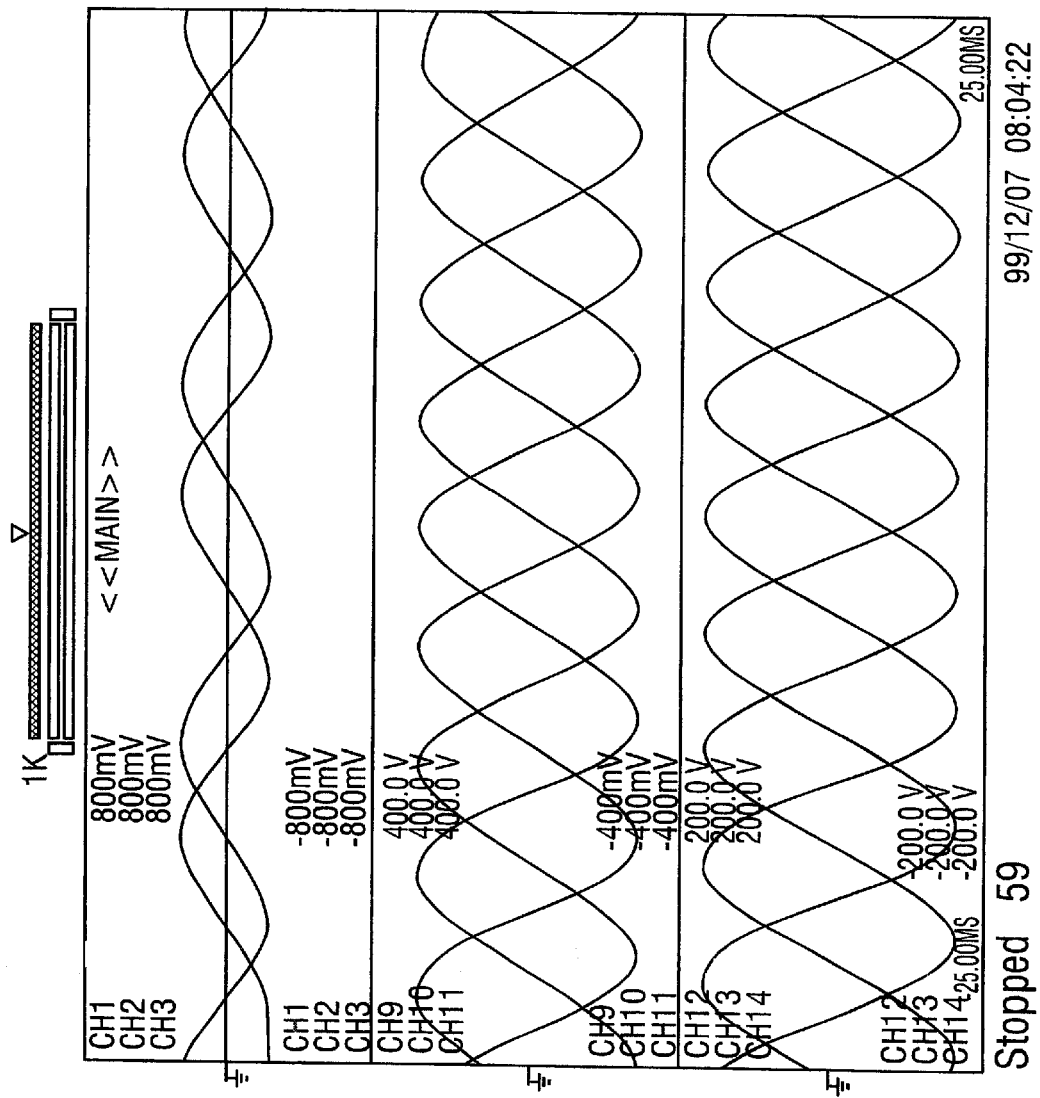
Figure 8D:
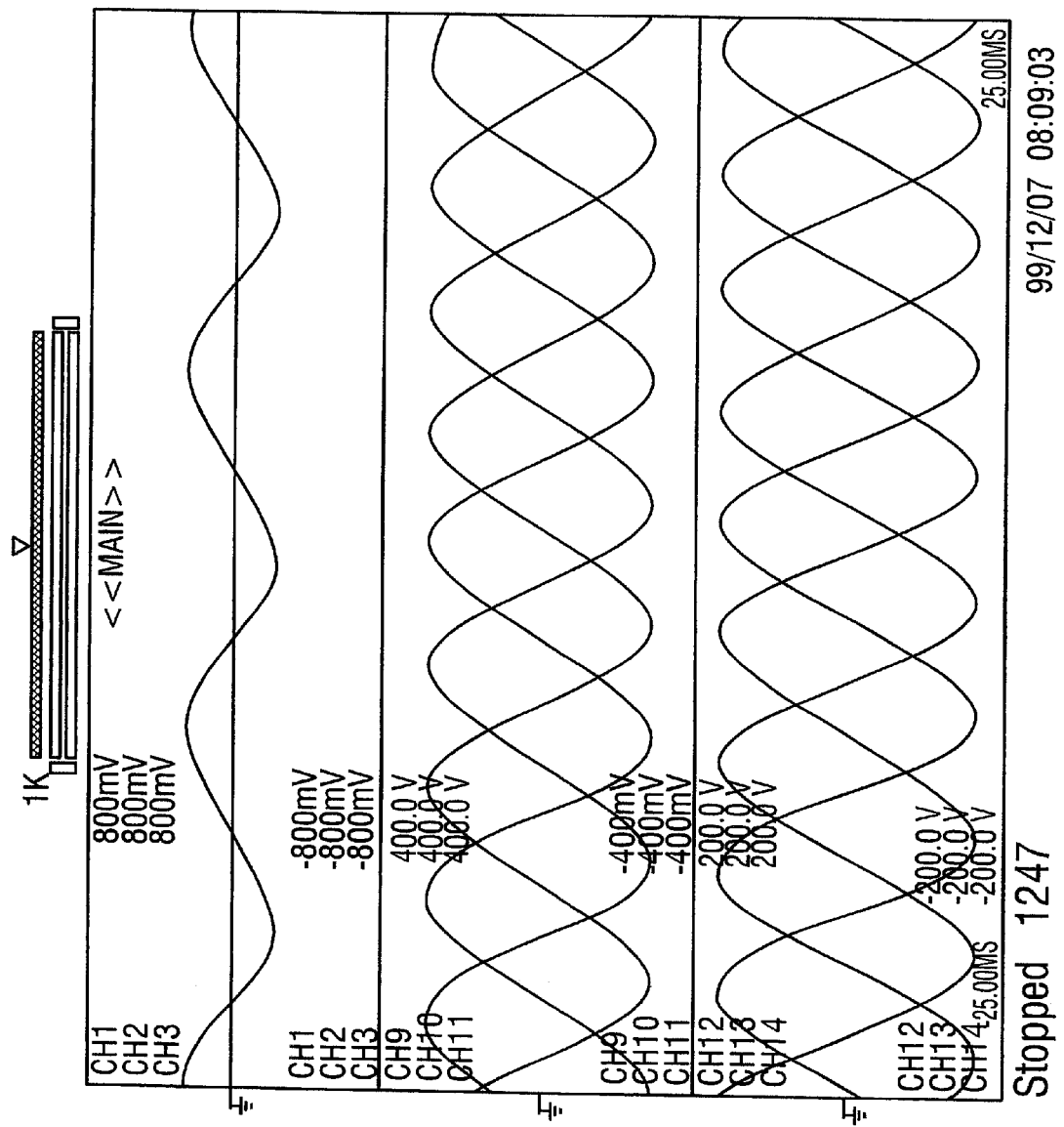

Using (41), during the current limit saturation, the servo compensator states will continue to oscillate at the harmonic frequency with constant magnitude. The resulting robust servomechanism controller structure is shown in FIG. 7.

Experimental Results

The effectiveness the proposed control strategy has been verified on an 80 kVA UPS unit with system parameters shown in Table 1. The DC bus voltage is obtained from a 6-pulse thyristor controlled rectifier in parallel with a 480V battery system. The DSP control system used is based on the TMS320F240 fixed point DSP with control timing diagram as given in FIG. 6. The PWM timing is calculated through a standard space vector PWM with switching frequency of 3.2 kHz $T_{pwm} = T_s = 320$ μsec.

The experimental results presented in this report have been obtained using the proposed control strategy with the $5^{th}$ and $7^{th}$ harmonics being eliminated. Table 2 gives the steady state RMS output voltages regulation under different types of loads. It can be seen that the control strategy provides good output voltages regulation in all cases. Note that the deviations in the output voltages for unbalanced load are due to the uncontrollable 0-component of the load currents. However, as can be seen the effect is minimal showing the effectiveness of the LC filter at the output side of the transformer.

Figure 9:
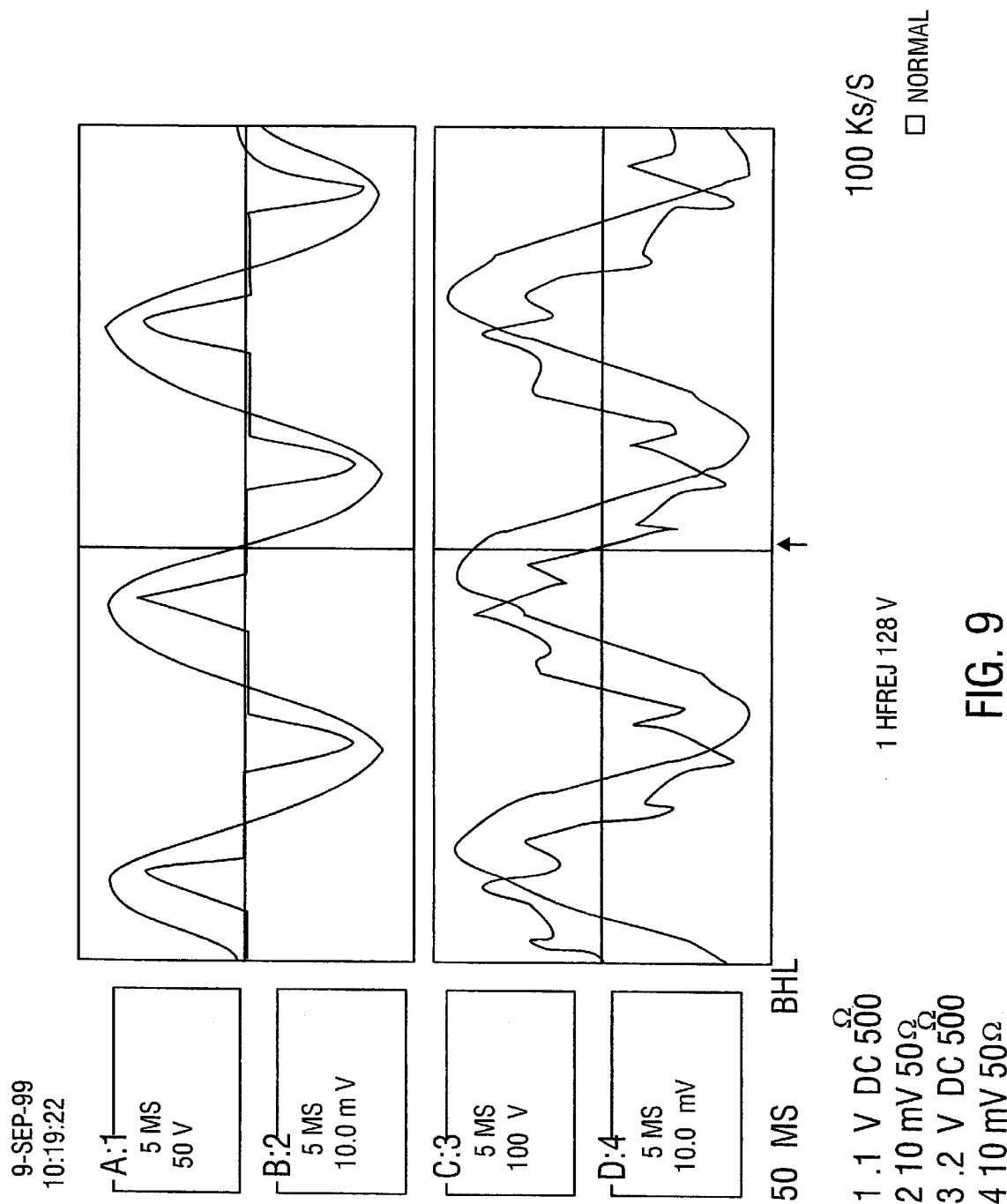
FIG. 9 shows the load voltages, load currents, inverter voltages, and inverter currents under non-linear loads.

FIG. 8 shows the waveforms of the load currents, load voltages, and inverter voltages under various linear loads: resistive, inductive, balanced, and unbalanced load. FIG. 9 shows the load voltages, load currents, inverter voltages, and inverter currents under non linear crest load. The THD of the load voltages in FIG. 9 was measured at 2.8% with the load currents of 3:1 crest factor. Table 3 summarizes the output voltages THD under different types of loads showing the superior THD performance of the proposed control strategy. Better results may be obtained by including more harmonies to be eliminated into the robust servomechanism controller.

TABLE 1

System Parameters

| | | |
|---|---|---|
| DC Bus Voltages | Vdc | 540 V (nom.) 390 V (min) |
| AC Output voltage | Vload | 208 V (LL-RMS), 120 V (LN) |
| | F | 60 Hz |
| Inverter filters | $C_{inv}$ | 540 μF |
| | $L_{inv}$ | 300 μH |
| Delta-Wye Transformer | $L_{trans}$ | 48 μH (~0.03 p.u) |
| | $R_{trans}$ | 0.02 ohm |
| Output filter | $C_{grass}$ | 90 μF |

TABLE 2

| | | Output voltages regulation | | | | | | |
|---|---|---|---|---|---|---|---|---|
| TYPE OF LOAD | % Reg | N LD OUTPUT V | | | AVG | FLD OUTPUT V | | AVG |
| V REG (100% RES LD) | 0.031 | 120.23 | 120.07 | 120.16 | 120.15 | 120.17 | 120.03 | 120.15 | 120.12 |
| V REG (100% 0.8 PF LD) | 0.033 | 120.23 | 120.07 | 120.16 | 120.15 | 120.20 | 120.00 | 120.14 | 120.11 |
| V REG (100% 2.75 ICF LD) | 0.019 | 120.23 | 120.07 | 120.16 | 120.15 | 120.14 | 120.11 | 120.14 | 120.13 |
| V REG, 100% UNBAL RES LD(A) | 0.019 | 120.23 | 120.07 | 120.16 | 120.15 | 120.59 | 119.59 | 120.21 | 120.13 |
| V REG 100% UNBAL RES LD AAB) | 0.028 | 120.23 | 120.07 | 120.16 | 120.15 | 120.67 | 119.97 | 119.72 | 120.12 |
| TYPE OF LOAD | % Reg | 540 VDC, OUTPUT V | | | AVG | 390 VDC, OUTPUT | | AVG |
| V REG. 100% RES LD ON BATT. @ 390 VDC | −0.089 | 120.17 | 120.03 | 120.15 | 120.12 | 120.26 | 120.12 | 120.29 | 120.22 |

TABLE 3

Output voltages THD

| TYPES OF LOAD | Output voltages THD |
|---|---|
| No load | 0.90% |
| 100% balanced resistive load | 1.30% |
| 100% 0.8 pf load | 1.32% |
| 100% unbal. Resistive (ph. A) | 1.70% |
| 100% unbal. Resistive (ph A & B) | 1.89% |
| Crest load (3:1) | 2.7% |

FIGS. 8A–8D the load currents, load voltages and inverter voltages for the experimental system loaded at steady state linear load as follows: (a) 100% resistive balanced; (b) 100% 0.8 pf load; (c) 100% resistive unbalanced (phase A unloaded) and; (d) 100 % resistive unbalanced (phase A&B). The top illustrates load currents. The middleindicates load voltages. The bottom indicates inverter voltages.

FIG. 9 illustrates the load voltages and load currents for a steady state non-linear load of 100% having 3:1 crest factor. The topillustrates phase A of load voltages and load currents, while the bottomillustrates phase A of inverter voltages and inverter currents.

Figure 10:
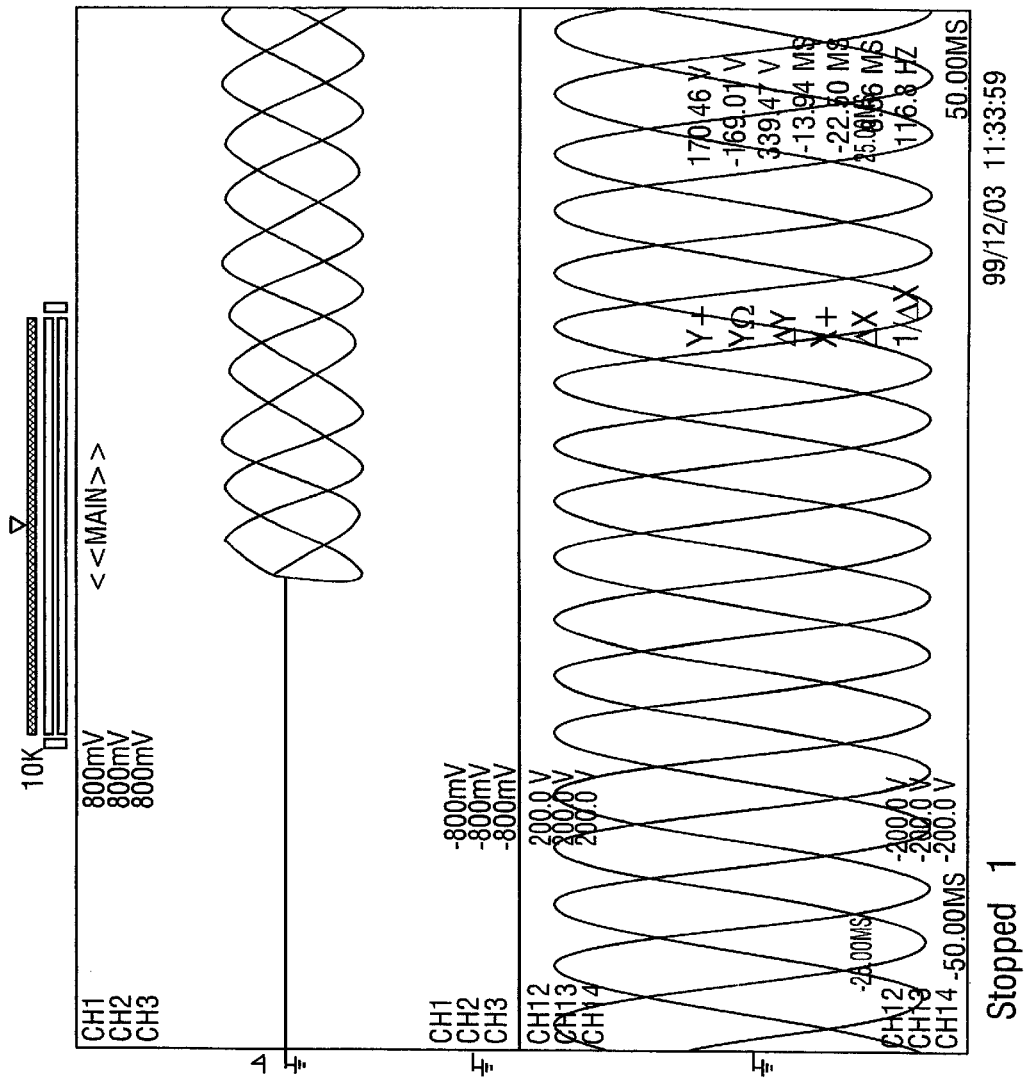
FIG. 10 illustrates a 0% to 100% resistive load transient.

FIG. 10 illustrates the load currents and load voltages for a 0 to 100% resistive load transient the topillustrates three-phase load currents, while the bottom illustrates three-phase load voltages.

Figure 11:
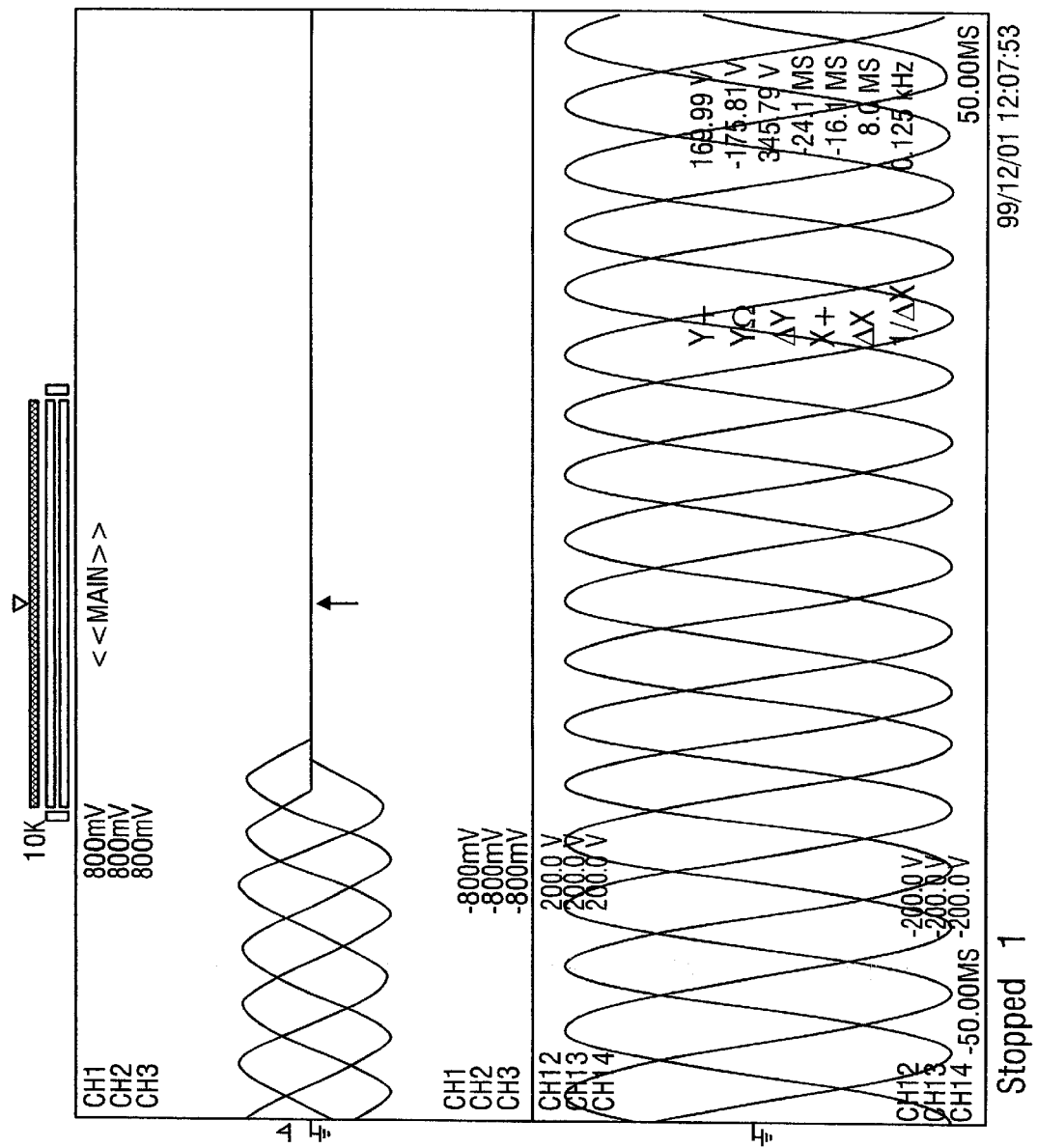
FIG. 11 illustrates the load voltages when subjected to a 100% to 0% purely resistive load transient.

FIG. 11 illustrates the load currents and load voltages for a 100% to 0% resistive load transient. The top illustrates three-phase load currents, and the bottom illustrates three-phase load voltages.

Figure 12:
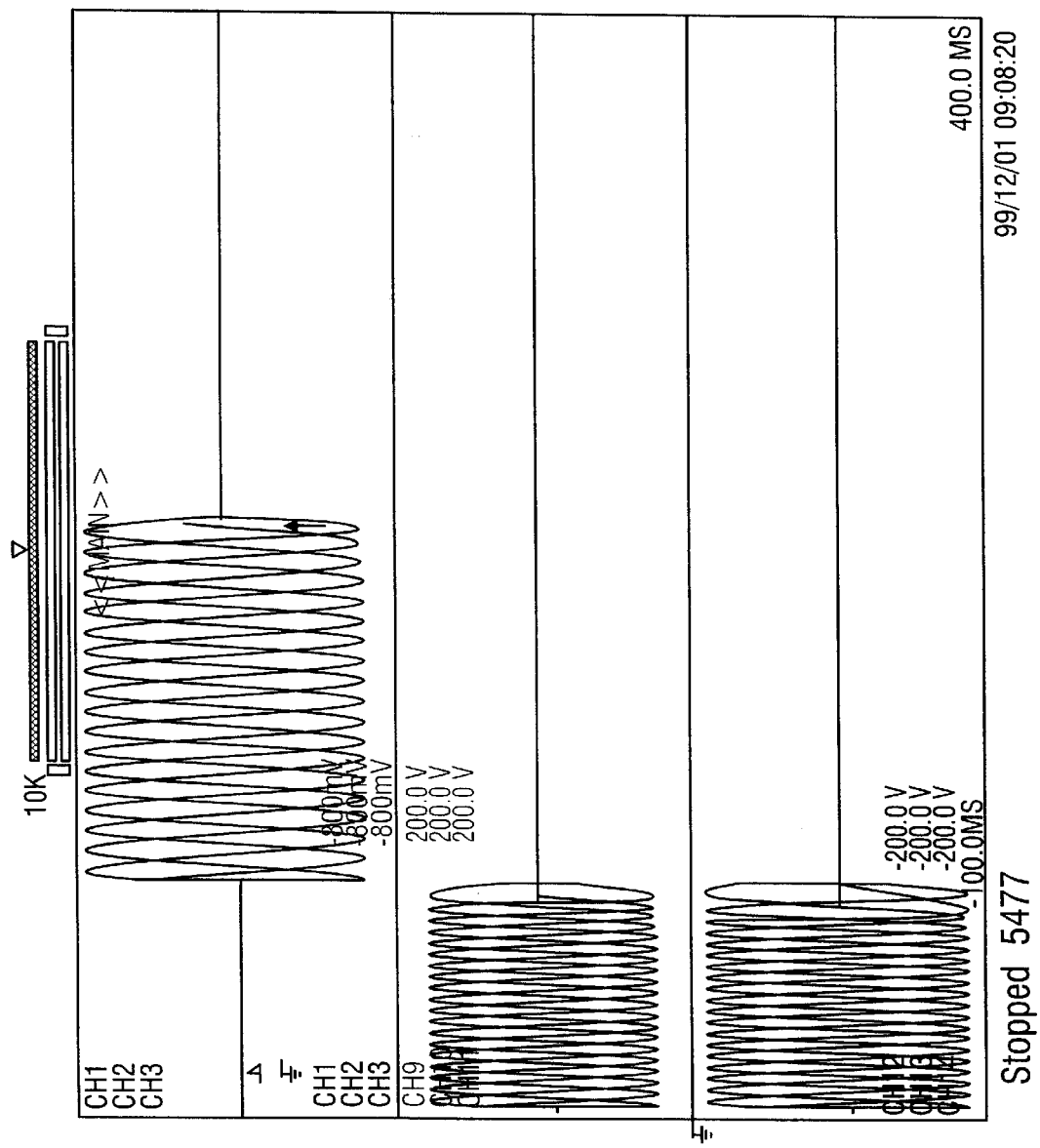
FIG. 12 illustrates the inverter currents during a short circuit.

FIGS. 9 and 10 show the responses of the load voltages on resistive load transients. 0–100% and 100%–0 respectively. It can be seen that the load voltages recover within less than a cycle after the load is applied. In both cases, the output voltages magnitudes deviate less than 5% of the nominal. These result show that the perfect RSP controller provides fast transient recovery under load transients with minimal overshoot in the response. Finally, the effectiveness of the current controller was verified by applying a sudden three-phase short circuit on the output load terminals. The current limit was set at 300% level, and the inverter was shutdown deliberately after ten cycles of short circuit condition. The results are shown in FIG. 12. It can be seen that the discrete sliding mode controller provides a fast and minimal overshoot on the inverter currents. The top illustrates inverter currents; the middle illustrates load voltages; and the bottom illustrates inverter voltages.

Step-By-Step Control Flow for One Embodiment

Figure 13:
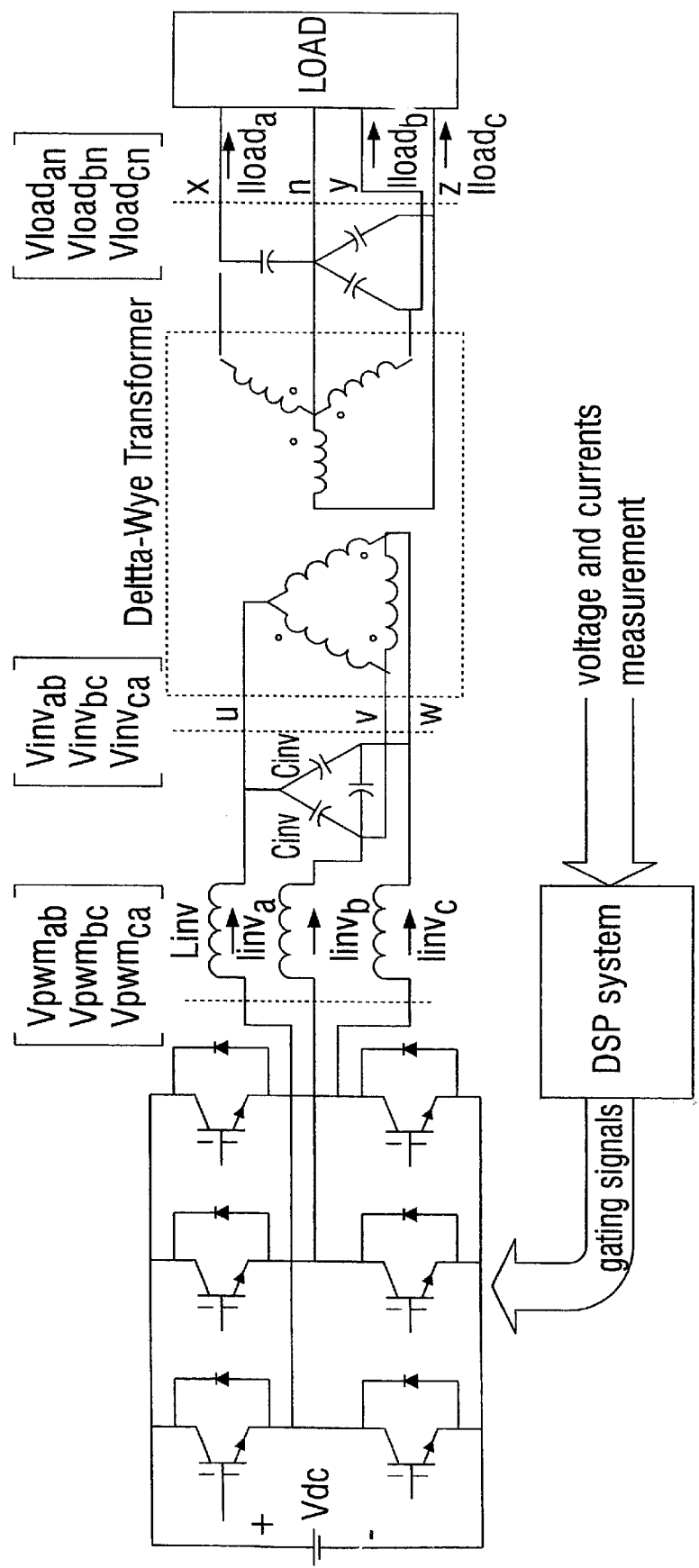
FIG. 13 illustrates a schematic of a power system controlled in accordance with the present invention.

The steps in operating the disclosed control system will now be described in sequence. A first step is, at each control sampling time k, sampling the following voltage and current signals: (1)the line-to-neutral voltages (at points xyz-n in FIG. 13) denoted as $Vload_{an}$, $Vload_{bn}$, and $Vload_{cn}$; (2) the load phase currents, denoted as $Iload_a$, $Iload_b$, and $Iload_c$; (3) the line-to-line inverter filter capacitor voltages (at points uvw in FIG. 13), denoted as $Vinv_{ab}$, $Vinv_{bc}$, and $Vinc_{ca}$; and (4) the inverter phase currents, denoted as $Iinv_a$, $Iinv_b$, and $Iinv_c$.

From the sampled values, the inverter voltage, inverter current, load voltage, and load current vectors are formed in abc reference frame:

$$\vec{V}inv_{abc}=[Vinv_{ab}\ Vinv_{bc}\ Vinv_{ca}]^T$$

$$\vec{V}load_{abc}=[Vload_a\ Vload_b\ Vload_c]^T$$

$$\vec{I}load_{abc}=[Iload_a\ Iload_b\ Iload_c]^T$$

$$\vec{I}inv_{abc}=[Iinv_{ab}\ Iinv_{bc}\ Iinv_{ca}]^T=[Iinv_a-Iinv_b\ Iinv_b-Iinv_c\ Iinv_c-Iinv_a]^T$$

Note that the inverter currents vectors are represented as line-to-line quantities. This is done to match the chosen state space equations and state variables used to derive the control. Inverter phase currents can also be used here with proper modification to the state space equations used.

The third step is to transform the sampled voltages and currents to the DQ0 stationary reference frame using the transformation:

$$\vec{f}_{qd0}^{\omega} = K-S\cdot\vec{f}_{abc},$$

with $$K_s = \frac{2}{3}\begin{bmatrix} 1 & -0.5 & -0.5 \\ 0 & -\sqrt{3/2} & \sqrt{3/2} \\ 0.5 & 0.5 & 0.5 \end{bmatrix},$$

$$f_{qd0} = [f_q, f_d, f_0]^T,\ f_{abc} = [f_a, f_b, f_c]^T$$

The following voltages and currents variables in DQ stationary reference frame are obtained:

$$\vec{V}inv_{qd0}=\vec{K}_s\cdot\vec{V}inv_{abc}=[Vinv_q\ Vinv_d\ Vinv_0]^T$$

$$\vec{I}inv_{qd0}=\vec{K}_s\cdot\vec{I}inv_{abc}=[Iinv_q\ Iinv_d\ Iinv_0]^T$$

$$\vec{V}\text{load}_{qd0} = \vec{K}_S \cdot \vec{V}\text{load}_{abc} = [V\text{load}_q\ V\text{load}_d\ V\text{load}_0]^T$$

$$\vec{I}\text{load}_{qd0} = \vec{K}_S \cdot \vec{I}\text{load}_{abc} = [I\text{load}_q\ I\text{load}_d\ I\text{load}_0]^T$$

The 0-component of the inverter voltages and currents will always be zero and can be discarded due to the three-wire system of the inverter. The 0-components of the load voltages and currents can be non-zero, however, these components are non-controllable and have no use for control. Therefore only the DQ components need to be used and calculated:

$$\vec{V}inv_{qd} = [Vinv_q\ (Vinv_d)]^T$$

$$\vec{V}load_{qd} = [Vload_q\ (Vload_d)]^T$$

$$\vec{I}inv_{qd} = [Iinv_q\ Iinv_d]^T$$

$$\vec{I}load_{qd} = [Iload_q\ (Iload_d)]^T$$

Note that the DQ0 transformation used here is a standard transformation commonly used in three-phase power applications. The transformation puts the three-phase variables in the system into an orthogonal coordinate system. The use of an orthogonal coordinate system allows the identification of state variables and creation of the state space equations for control purposes.

The fourth step is to generate the sine waves references at discrete time k for the load voltages in the abc reference frame and perform the DQ transformation on them to obtain the references in DQ.

$$\text{Vref}_{an} = V_{mA} \cdot \sin(2 \cdot \pi \cdot f_{ref} \cdot k \cdot T_S)$$
$$\text{Vref}_{bn} = V_{mB} \cdot \sin(2 \cdot \pi \cdot f_{ref} \cdot k \cdot T_S - 2\pi/3)$$
$$\text{Vref}_{cn} = V_{mC} \cdot \sin(2 \cdot \pi \cdot f_{ref} \cdot k \cdot T_S + 2\pi/3)$$

where $V_{mA}$ is the voltage magnitude of reference AN, VmB is the voltage magnitude of reference BN, VmC is the voltage magnitude of reference CN, $T_S$ is the sampling period, and $f_{ref}$ is the fundamental reference frequency.

These voltages are then transformed to DQ reference frame:

$$\vec{V}\text{ref}_{abc} = [V\text{ref}_{an}\ V\text{ref}_{bn}\ V\text{ref}_{cn}]^T$$

$$\vec{V}\text{ref}_{qd0} = \vec{K}_S \cdot \vec{V}ref_{abc} = [V\text{ref}_q\ V\text{ref}_d\ V\text{ref}_0]^T$$

Again only the DQ components are needed for control:

$$\vec{V}ref_{qd} = [V\text{ref}_q\ V\text{ref}_d]$$

The fifth step is then to compute the load voltage errors to be used by the voltage servo compensator, which are given by: $e_q = V\text{ref}_q - V\text{load}_q$ and $e_d = V\text{ref}_d - V\text{load}_d$.

Figure 14:
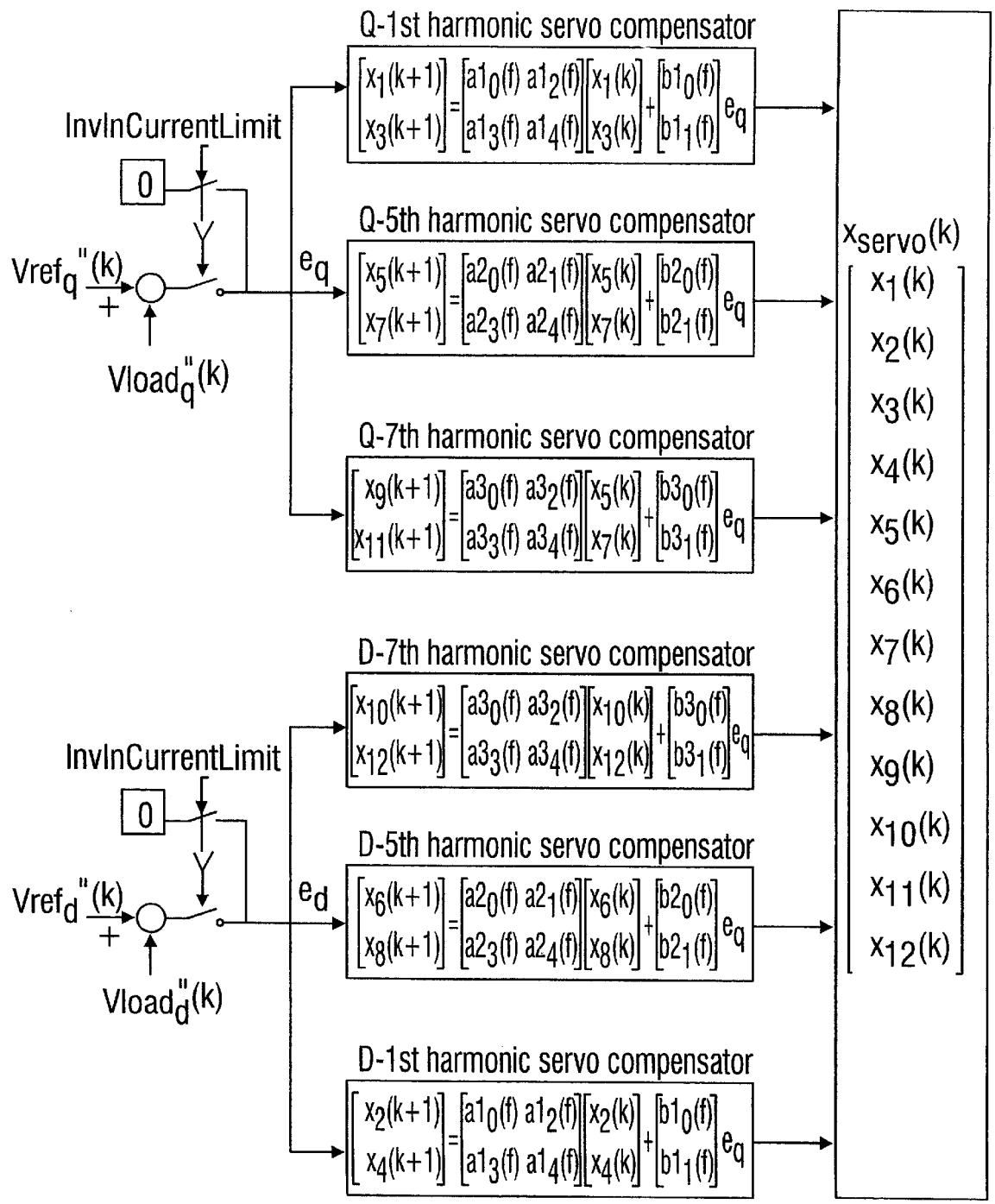
FIG. 14 illustrates the discrete state space implementation of the harmonic-eliminating transfer function for the fundamental frequency and the fifth and seventh harmonics.

The sixth step is to calculate the next discrete states (time k+l) of the servo compensator for each of the harmonic frequency to be eliminated and the fundamental frequency and for each Q and D axis voltages errors. FIG. 14 shows the case when the 5$^{th}$ and 7$^{th}$ are to be eliminated. Each harmonic servo compensator block in FIG. 2 is the discrete state space implementation of the analog transfer function:

$$T(s) = \frac{1}{s^2 + \varpi_n^2}$$

where $T_1 = 2B\theta i\theta f$, f is the fundamental frequency and i-f is the harmonic frequency (i.e., in the case of FIG. 14, i=1, 5, and 7). Specifically, the following continuous state space implementation of T(s) is used for each harmonic servo compensator block:

$$\dot{\rho}_{n_i} = \begin{pmatrix} 0 & 1 \\ \omega_i^2 & 0 \end{pmatrix} \rho_{n_i} + \begin{pmatrix} 0 \\ 1 \end{pmatrix} e$$

which is then discretized to obtain the a's and b's coefficients shown in FIG. 14. A standard discretization method like ZOH (Zero order hold) method is used in this case. Each harmonic servo compensator block in FIG. 14 ensures the elimination of the corresponding harmonic contents of the errors signals. This condition is guaranteed by the internal model principle that states that if frequency modes (poles) of the references and the disturbances to be eliminated are included in the control loop, then the steady state error will not contain these frequency contents. Each of these harmonic compensators can be viewed as signals generators that vary at the harmonic frequency and reacts only to the existence of the corresponding harmonic in the errors signals. It provides adjustment to the inverter current commands generated by the voltage control loop to force the corresponding harmonic content of the errors to zero.

Figure 15:
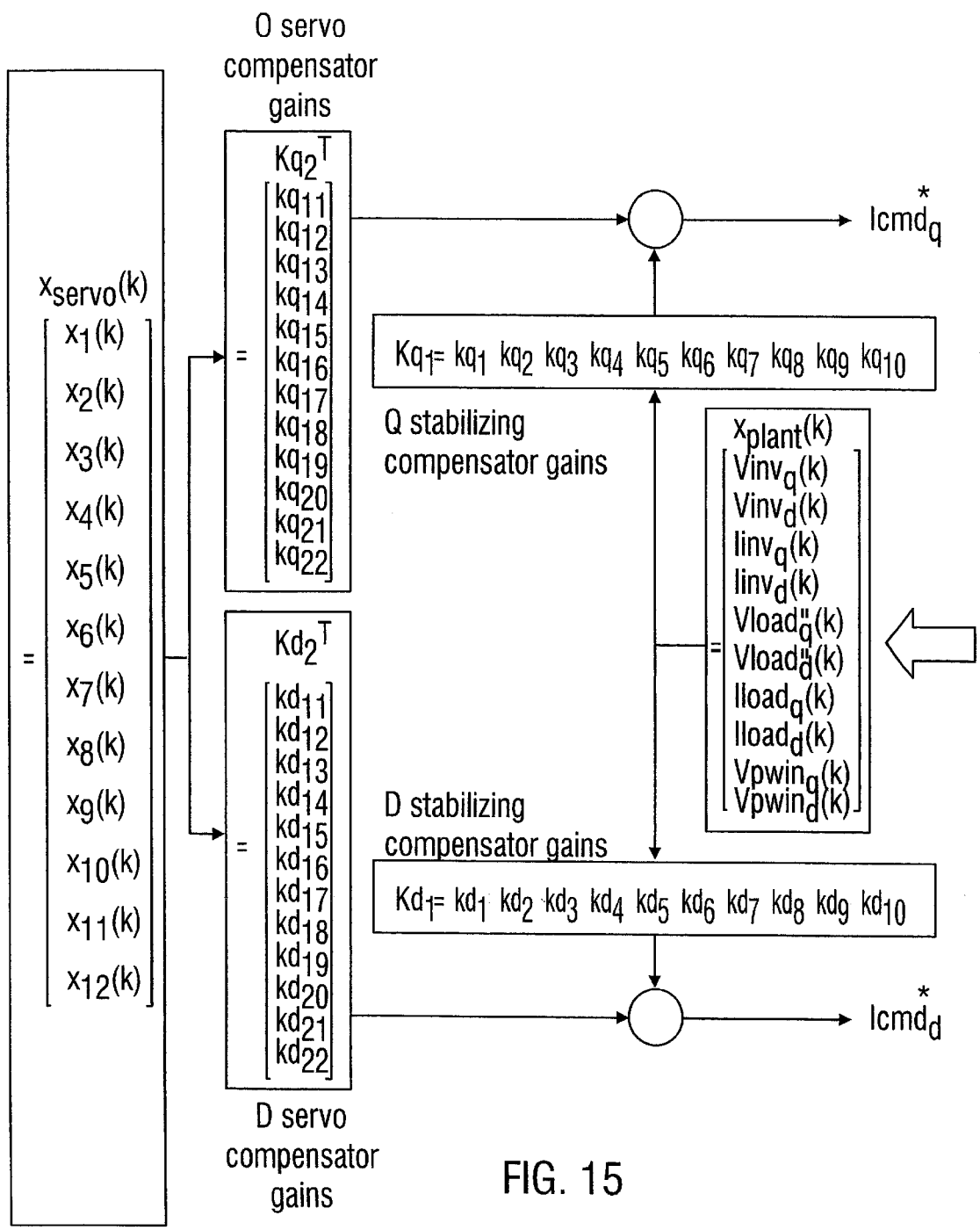
FIG. 15 illustrates the overall sum for each axis derived by multiplying each state of the servo compensator states ($x_{servo}(k)$) with the corresponding servo compensator gains.

The seventh step is to multiply each state of the servo compensator states ($x_{servo}(k)$) with the corresponding servo compensator gain and get the overall sum for each axis as shown in FIG. 15. The plant states (consisting of the inverter voltages, inverter currents, load voltages, load currents, and the previous PWM voltage commands) are multiplied with the stabilizing compensator gains to get the summation for each axis. The sum of the servo compensator and the stabilizing compensator for each axis constitutes the inverter current commands generated by the voltage control loop i.e., Icmd$_q$ and Icmd$_d$.

The servo compensator and the stabilzing compensator gains are designed to ensure the stability of the overall control loop i.e., the combined voltage control loop and the current control loop. The perfect RSP theory provides a way of calculating these gains using an OPTIMAL Control Technique. Using this technique, a cost function consisting of the weighted sum of squares of the servo compensator states, the plant states, and the control inputs (inverter current commands) is created. An optimization routine is then used to seek for the gains that minimize this cost function. The weighted sum of squares of the servo compensator states in this case can be viewed as the energy in the errors signals, while those of the plant states and the control inputs can be viewed as the fuel energy needed. Different weighting used can be used to obtain different behavior of the control system.

The eighth step in the control method is to perform the current limiting function. The purpose of this current limiting function is to limit the inverter currents commands generated by the voltage controller. At each sampling time the inverter currents commands generated by the voltage controller will be implemented by the inner current loop which will compute the necessary PWM command.

Figure 16:
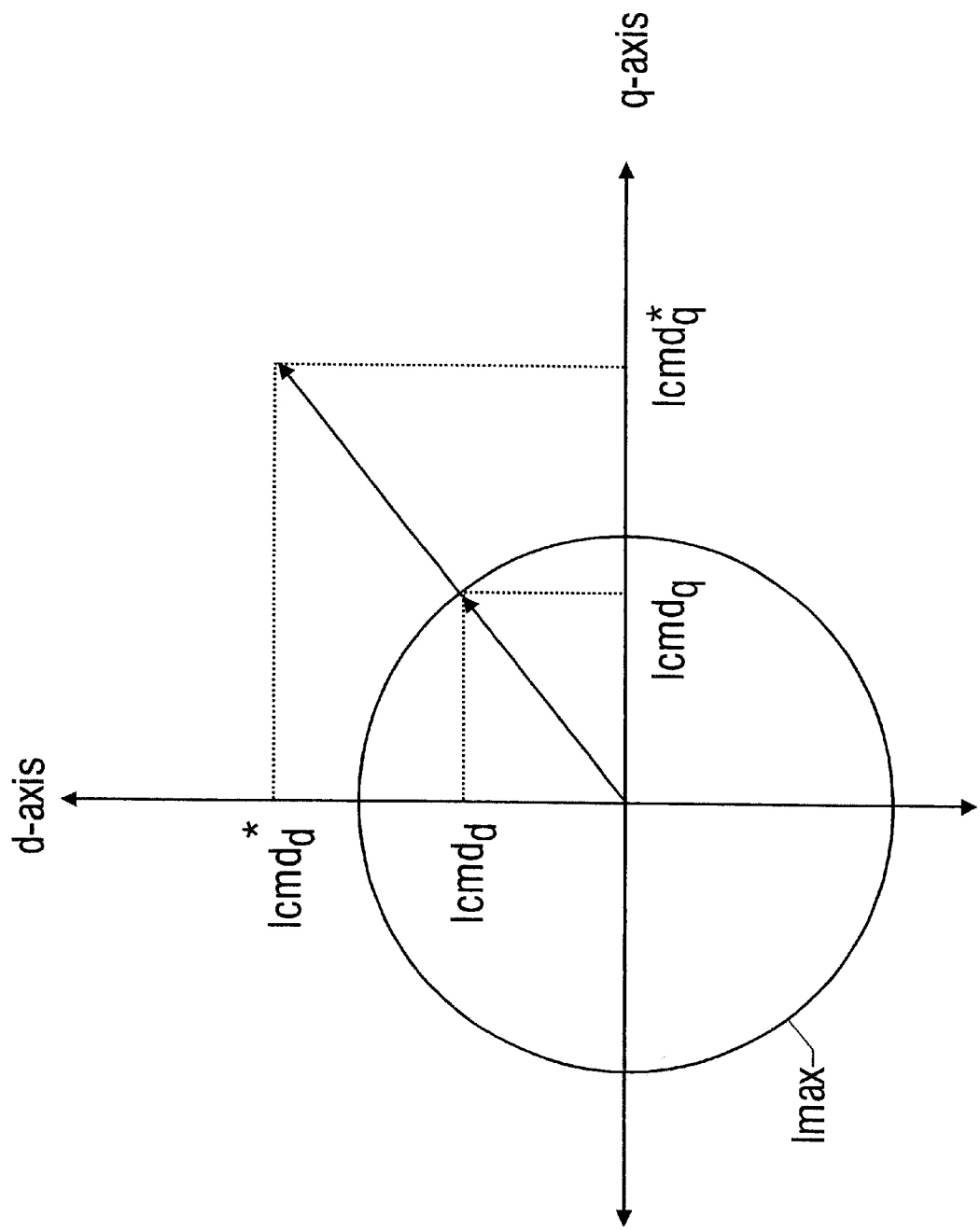
FIG. 16 illustrates the current limiting accomplished by limiting the magnitude of the inverter current commands vector and maintaining its original direction.

The current limiting is accomplished by limiting the magnitude of the inverter current commands vector and maintaining its original direction as shown in FIG. 16. The current limit appears as a circle in the DQ stationary reference frame. If the command vector generated by the voltage controller goes outside of this circle, its magnitude is limited to be within the circle with its direction unaltered. Limiting the inverter currents in this way ensures that at each time the magnitudes of the 3-phase inverter currents in the abc reference frame remain within the limit value but still provides the phase relations required by the voltage control loop. Mathematically, this limiting function can be written as:

$$\vec{I}cmd_{qd}(k) = \begin{cases} \vec{I}cmd_{qd}^*(k) & \text{if } \left|\vec{I}cmd_{qd}^*(k)\right| \leq I_{max} \\ \dfrac{\vec{I}cmd_{qd}^*(k)}{\left|\vec{I}cmd_{qd}^*(k)\right|} I_{max} & \text{if } \left|\vec{I}cmd_{qd}^*(k)\right| \leq I_{max} \end{cases}$$

where absolute value indicates square root of sum of the squares.

The ninth step in the control method is to compute the errors between the limited inverter current commands and the actual inverter commands as follows: $el_q = Icmd_q - linv_q$ and $el_d = Icmd_d - linv_d$. The discrete sliding mode current controller will force these errors to zero at the next sampling time (k+1) by computing the necessary PWM voltage command.

The tenth step is to compute the one-half step ahead prediction of the inverter voltages and currents and the load currents. These predicted values of the voltages and currents are necessary to account for the delay in the application of the PWM voltage due to DSP computation time.

$$\vec{x}_1^P(k) = 1.5 \cdot \vec{x}_1(k) - 0.5 \cdot \vec{x}_1(k-1) \quad \vec{d}_1^P(k) = 1.5 \cdot \vec{d}_1(k) - 0.5 \cdot \vec{d}_1(k-1) \quad (28)$$

The eleventh step is to compute the necessary PWM voltages to implement the inverter current command using the Discrete sliding mode current controller. The Discrete Sliding Mode current controller ensures that at the next sampling time (k+1), the inverter current commands obtain the values of the command using the available DC bus voltage at the time. The necessary PWM voltages commands are given by:

$$\vec{V}pwm_{qd} = u(k) = \begin{cases} \vec{u}_{eq}(k) & \text{for } \|\vec{u}_{eq}(k)\| \leq u_0 \\ u_0 \dfrac{\vec{u}_{eq}(k)}{\|\vec{u}_{eq}(k)\|} & \text{for } \|\vec{u}_{eq}(k)\| \leq u_0 \end{cases}$$

$$\vec{u}_{eq}(k) = (C_1 B_1^*)^{-1} (\vec{I}cmd_{qd}) - C_1 A_1 * \vec{x}_1^P(k) - C_1 E_1 * \vec{d}_1^P(k)$$

Note the PWM voltage commands are limited by the amount of available DC bus voltage at that time. This limit value is denoted as $u_0$ in the above equations.

The twelfth and final step involves implementation of the PWM voltage commands into an actual PWM voltages using a standard Space Vector PWM technique. The Space Vector PWM technique takes the PWM voltages commands $Vpwm_q$ and $Vpwm_d$, and computes the necessary timing to switch on and off the power switches.

Having shown and described a preferred embodiment of the invention, those skilled in the art will realize that many variations and modifications may be made to II affect the described invention and still be within the scope of the claimed invention. Thus, many of the elements indicated above may be altered or replaced by different elements which will provide the same result and fall within the spirit of the claimed invention.

For example, it is appreciated that the present invention may be used with single-phase systems. It is also appreciated that various inverter systems may be used as well as other Uninterruptible Power Supplies. It is the intention, therefore, to limit the invention only as indicated by the scope of the claims.

What is claimed is:

1. A method reducing transient overshoot of an output signal of an uninerruptable power supply, the uniterruptable power supply including: (a) an inverter having at least one power switch; (b) a digital controller that generates a pulse width modulated (PWM) signal for controlling the power switch, the PWM signal having a fixed period $T_{PWM}$ and (c) an analog to digital signal corresponding to the sampled output signal, the method comprising the steps of:

i) operating the A/D converter to sample the output signal at a first time to generate a first sampled output value;

ii) operating the A/D converter to sample the output signal at a second time to generate a second sampled output value, the period between the second time and the first time being equal to $T_{pwm}$;

(iii) generating a control input value that is equal to 1.5 times the second sampled output value minus 0.5 times the first sampled output value;

(iv) computing a PWM pulse duration as a function of the control input value;

(v) initiating a pulse of the PWM signal at a third time, the PWM pulse having a duration equal to the PWM pulse duration, the period between the second time and the third time being equal to $0.5 \, T_{PWM}$.

* * * * *

UNITED STATES PATENT AND TRADEMARK OFFICE
CERTIFICATE OF CORRECTION

PATENT NO.   : 6,466,465 B1
DATED        : October 15, 2002
INVENTOR(S)  : Mohammad M. Marwali It is certified that error appears in the above-identified patent and that said Letters Patent is hereby corrected as shown below:

<u>Title page,</u>
Item [57], ABSTRACT, delete the entire ABSTRACT and in its place insert
-- The development of a digital control strategy for the three-phase PWM inverter used in UPS applications is disclosed. The control strategy combines the *perfect RSP* controller for low THD output voltages regulation and the discrete sliding mode current controller for fast over-current protection. The voltage controller was developed by including the dynamic of the current controller into the plant with the computation delay of the DSP accounted for. It was shown that by including the harmonic frequency made to be eliminated into the perfect RSP controller, superior low THD performance could be achieved without sacrificing the transient recovery performance of the output voltages --

<u>Column 20,</u>
Line 28, after the word "digital" add -- (A/D) converter that is coupled to sample the output signal of the inverter and product a digital --

Signed and Sealed this

Eleventh Day of March, 2003

JAMES E. ROGAN
*Director of the United States Patent and Trademark Office*